(12) United States Patent
Eriksson et al.

(10) Patent No.: US 11,057,954 B2
(45) Date of Patent: Jul. 6, 2021

(54) NETWORK ASSISTANCE VIA A LOCAL BREAKOUT FUNCTION-GATEWAY IN RAN

(71) Applicant: Telefonaktiebolaget LM Ericsson (publ), Stockholm (SE)

(72) Inventors: Ann-Christine Eriksson, Enköping (SE); Angelo Centonza, Stockholm (SE); Frederic Gabin, Bangolet (FR); Thorsten Lohmar, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 38 days.

(21) Appl. No.: 16/337,558

(22) PCT Filed: Sep. 28, 2017

(86) PCT No.: PCT/IB2017/055980
§ 371 (c)(1),
(2) Date: Mar. 28, 2019

(87) PCT Pub. No.: WO2018/060930
PCT Pub. Date: Apr. 5, 2018

(65) Prior Publication Data
US 2019/0350025 A1    Nov. 14, 2019

Related U.S. Application Data

(60) Provisional application No. 62/402,199, filed on Sep. 30, 2016.

(51) Int. Cl.
*H04W 76/15*    (2018.01)
*H04W 24/08*    (2009.01)
*H04W 28/02*    (2009.01)

(52) U.S. Cl.
CPC ........... *H04W 76/15* (2018.02); *H04W 24/08* (2013.01); *H04W 28/0252* (2013.01)

(58) Field of Classification Search
None
See application file for complete search history.

(56) References Cited

U.S. PATENT DOCUMENTS 9,179,392 B2 * 11/2015 Rubin ................... H04L 65/403
2012/0002608 A1 * 1/2012 Vesterinen ............ H04W 8/082
370/328

(Continued)

FOREIGN PATENT DOCUMENTS

| JP | 2010 537526 A | 12/2010 |
| JP | 2017507601 A | 3/2017 |
| WO | 2015 124210 A1 | 8/2015 |

OTHER PUBLICATIONS

PCT International Search Report for International application No. PCT/IB2017/055980—dated Jan. 24, 2018.

(Continued)

*Primary Examiner* — Lonnie V Sweet
(74) *Attorney, Agent, or Firm* — Baker Botts, LLP

(57) ABSTRACT

A method in a network node (115) comprises establishing (1604) a first bearer (1310, 1520) between a local breakout function gateway (1220), the local breakout function gateway collocated at the network node, and an application client (1210, 1405, 1505) of a wireless device (110). The method comprises transmitting (1608) network assistance information to the wireless device over the first bearer via application-layer signaling in the user plane, the network assistance information comprising information related to optimizing transmission of user data over a second bearer (1305, 1515) established between the wireless device and a core network node (130).

28 Claims, 23 Drawing Sheets

(56) References Cited

U.S. PATENT DOCUMENTS

| | | | |
|---|---|---|---|
| 2012/0093074 A1 | 4/2012 | Sairanen et al. | |
| 2012/0198081 A1* | 8/2012 | Zhao | H04L 47/767 709/227 |
| 2013/0272181 A1 | 10/2013 | Fong et al. | |
| 2014/0335839 A1* | 11/2014 | Rubin | H04B 17/00 455/416 |
| 2015/0023254 A1 | 1/2015 | Hahn et al. | |
| 2016/0227439 A1 | 8/2016 | Wang et al. | |
| 2017/0196044 A1* | 7/2017 | Nord | H04W 52/0258 |
| 2017/0251405 A1* | 8/2017 | Stojanovski | H04W 36/0016 |
| 2018/0109911 A1* | 4/2018 | Chandramouli | H04W 4/06 |
| 2018/0288784 A1* | 10/2018 | Stojanovski | H04W 76/12 |
| 2019/0075493 A1* | 3/2019 | Melander | H04W 72/0453 |

OTHER PUBLICATIONS

PCT Written Opinion of the International Searching Authority for International application No. PCT/IB2017/055980—dated Jan. 24, 2018.

JP Notice of Reasons for Rejection issued for Patent Application No. 2019-517810—dated Mar. 10, 2020.

Communication Pursuant to Article 94(3) EPC issued for Application No. 17 792 189.7-1212—dated Jul. 13, 2020.

Examination Report issued by Intellectual Property India for Application No. 201917010616—dated Aug. 22, 2020.

Japanese Notice of Reasons for Rejection issued for Patent Application No. 2019-517810—dated Jul. 30, 2020.

* cited by examiner

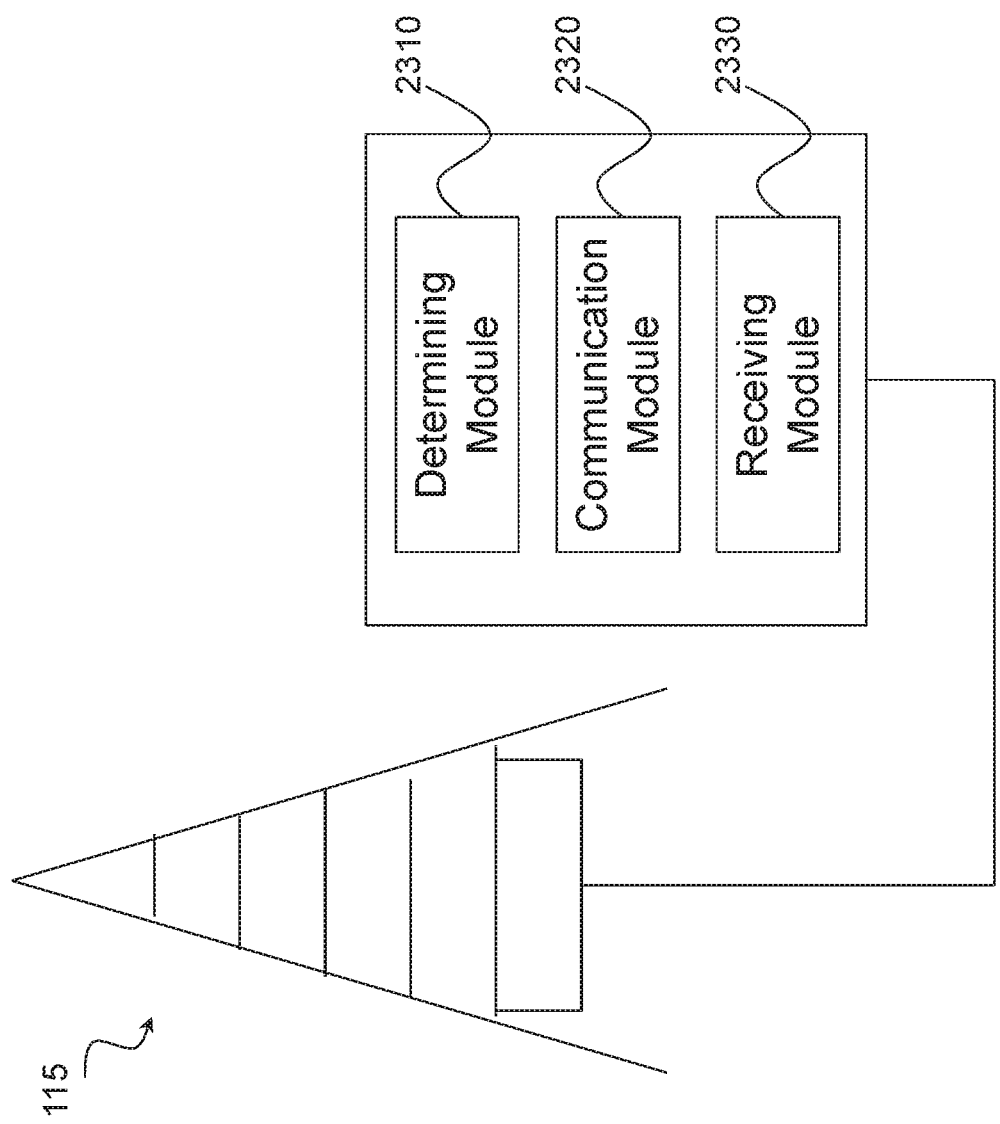

US 11,057,954 B2

NETWORK ASSISTANCE VIA A LOCAL BREAKOUT FUNCTION-GATEWAY IN RAN

PRIORITY

This nonprovisional application is a U.S. National Stage Filing under 35 U.S.C. § 371 of International Patent Application Ser. No. PCT/IB2017/055980 filed Sep. 28, 2017 and entitled "Network Assistance via a Local Breakout Function-Gateway in RAN"which claims priority to U.S. Provisional Patent Application No. 62/402,199 filed Sep. 30, 2016, both of which are hereby incorporated by reference in their entirety.

TECHNICAL FIELD

The present disclosure relates, in general, to wireless communications and, more particularly, to providing network assistance via a local breakout function gateway.

BACKGROUND

The present disclosure relates to providing new functionality in existing Radio Access Networks (RANs) (e.g., 2G, 3G, 4G, etc.) and future RANs (e.g., 5G, 6G, etc.) for interactions between a service domain and a RAN domain, for example between a client application running on a wireless device (e.g., a user equipment (UE)) and a RAN network node (such as an evolved NodeB (eNB)).

FIG. 1 is a simplified illustration of a network 1. FIG. 1 illustrates a wireless device 110 (e.g., a UE) and multiple areas of network 1. The areas of network 1 depicted in FIG. 1 include Mobile Operator RAN 5, Mobile Operator Core Network 10, Mobile Operator Service Network 15, and Internet 20. Wireless device 110 includes operating system (OS) 25, browser 30, Application X 35$x$ and Application Y 35$y$. Mobile Operator RAN 5 includes one or more network nodes 115 (e.g., an eNB and/or radio network controller (RNC))

In the example of FIG. 1, Application X 35$x$ and Application Y 35$y$ in wireless device 110 each communicate with their respective servers 40$x$, 40$y$ located on Internet 20 via Mobile Operator RAN 5, Mobile Operator Core Network 10, and Mobile Operator Service Network 15. For example, wireless device 110 may perform adaptive bit rate video streaming over Application X 35$x$ and Application Y 35$y$. Using adaptive bit rate video streaming service as an example, for this service the video servers 40 have the video encoded in different bitrates, and wireless device 110 selects the format based on throughput estimations.

End user experience or Quality of Experience (QoE) is a key differentiator for mobile operators and Internet service providers. Applications (e.g., Application X 35$x$ and Application Y 35$y$) attempt to be adaptive to ensure a good QoE (for example, by adapting to varying throughput by changing to an encoded format with a suitable bitrate). Currently, this is done by trying to estimate the throughput between a server 40 and an application 35 in wireless device 110, for example based on measured link bit rate or round trip times (RTTs). How frequently the bitrate can be changed varies. A typical interval for adaptive video streaming would be every 2-5 seconds.

Evolved Packet System (EPS) is the Evolved 3$^{rd}$ Generation Partnership Project (3GPP) Packet Switched Domain. The EPS includes the Evolved Packet Core (EPC) and Evolved Universal Terrestrial Radio Access Network (E-UTRAN).

FIG. 2 illustrates an overview of the EPC architecture. More particularly, FIG. 2 illustrates the non-roaming EPC architecture for 3GPP accesses. This architecture is defined in 3GPP Technical Specification (TS) 23.401. Details regarding the Packet Data Network (PDN) Gateway (PGW), Serving Gateway (S-GW), Policy and Charging Rules Function (PCRF), Mobility Management Entity (MME) and UE, including their respective definitions, are provided therein. The Long Term Evolution (LTE) radio access (E-UTRAN), consists of one more eNBs.

FIG. 3 illustrates an overview of the E-UTRAN overall architecture. The E-UTRAN architecture is further defined in, for example, 3GPP TS 36.300. E-UTRAN 300 consists of eNBs 305$a$-$c$, providing the E-UTRA user plane (including the Packet Data Convergence Protocol (PDCP), Radio Link Control (RLC), Medium Access Control (MAC), Physical (PHY)) and control plane (e.g., Radio Resource Control (RRC)) protocol terminations towards the UE. In the example of FIG. 3, eNBs 305$a$-$c$ are interconnected with each other by means of the X2 interface. eNBs 305$a$-$c$ are also connected by means of the S1 interface to the EPC, more specifically to the MME 310 by means of the S1-MME interface and to the S-GW 315 by means of the S1-U interface.

The main parts of the EPC Control Plane (CP) and User Plane (UP) architectures are illustrated in FIGS. 4 and 5. More particularly, FIG. 4 illustrates an example of the EPC Control Plane protocol architecture. FIG. 5 illustrates an example of the EPC User Plane protocol architecture.

In 3GPP, QoS is managed on a per-bearer level from the core network. The RAN is responsible for setting up the radio bearers, radio resource management, and enforcing QoS according to the bearer QoS Profile over the radio (e.g., LTE-Uu) interface in the downlink (DL) and over the transport network in the uplink (UL). The architectures differ slightly over the different radio access networks (e.g., 3G/WCDMA and 4G/LTE) but the QoS principles are very similar (at least for 3G and 4G networks).

FIG. 6 illustrates an example of the EPS bearer architecture. More particularly, FIG. 6 illustrates the EPS bearer architecture and the different levels of "bearers" building up the end-to-end connection for the UE. Many services and subscribers share the same radio and network resources.

Real-time services (e.g., voice, video, etc.) share the same resources as non-real-time services (e.g., Internet browsing, file download, etc.). One challenge in this area is how to ensure QoS (e.g., bit rates, packet delays, packet loss) for Real Time Services. 3GPP EPS (i.e., both E-UTRAN and EPC) provides efficient QoS mechanisms to ensure that the user experience of different services sharing the same resources is acceptable. One example of such a mechanism provided in 3GPP is traffic separation. Different traffic types receive different treatment (e.g., queuing, etc.) in the network. As another example, 3GPP provides for both relative QoS and absolute QoS (using Guaranteed Bit Rates (GBRs)). As still another example, GBR-based admission control is used to reserve resources before traffic is admitted into the network or rejected otherwise. As yet another example, policy (enforced through Policy Control and Charging (PCC), an element of the PCRF described above in relation to FIG. 2, which encompasses, for example, flow based charging, including charging control and online credit control and policy control (e.g., gating control, QoS control, and QoS signaling)) determines what treatment to apply to the traffic streams.

3GPP defines the concept of a Packet Data Network (PDN). A PDN is, in most cases, an Internet Protocol (IP)

network (e.g., the Internet or an operator IP Multimedia Subsystem (IMS) service network). A PDN has one or more names. Each name is defined in a string called Access Point Name (APN). The PGW is a gateway towards one or more PDNs. A UE may have one or more PDN connections. A PDN connection is a logical IP tunnel between the UE and the PGW, providing the UE access to a PDN. The setup of a PDN connection is initiated from the UE.

Every PDN connection consists of one or more bearers, as described in section 4.7.2 of 3GPP TS 23.401. A bearer uniquely identifies traffic flows that receive a common QoS treatment between a UE and a PGW. Each bearer on a particular access has a unique bearer ID. On the 3GPP access, the bearer is end-to-end between the UE and PGW. Every PDN connection has at least one bearer, and this bearer is called the default bearer. All additional bearers on the PDN connection are called dedicated bearers.

There are two types of bearers: GBR and non-GBR bearers. Every EPS bearer is associated with the following QoS parameters: QoS Class Identifier (QCI) and Allocation and Retention Priority (ARP). GBR bearers are in addition associated with bit rate parameters for Guaranteed Bit Rate (GBR) and Maximum Bit Rate (MBR). Non-GBR bearers do not have bearer-level bit rate parameters. Instead, there is aggregate enforcement of all non-GBR bearers using Aggregate Maximum Bit Rates (AMBR). APN-AMBR is defined per subscriber and Access Point Name, and UE-AMBR is defined per subscriber.

A bearer carries traffic in the form of IP packets. Which traffic is carried on a bearer is defined by filters. A filter is an n-tuple where each element in the tuple contains a value, a range, or a wildcard. An n-tuple is also known as an IP flow.

An example of a 5-tuple is (destination (dst) IP=83.50.20.110, source (src) IP=145.45.68.201, dst port=80, src port=*, prot=TCP). This 5-tuple defines a source and destination IP address, a source and destination port, and a protocol. The source port is a wildcard. Traffic matching this 5-tuple filter would be all Transmission Control Protocol (TCP) traffic from IP=145.45.68.201 to IP=83.50.20.110 and port=80.

A traffic flow template (TFT) contains one or more filters. Every bearer has a TFT. One bearer within a PDN connection and access may lack an explicit TFT (this bearer is typically the default bearer). Implicitly, such bearer has a TFT with a single filter matching all packets.

FIG. 7 illustrates an example of two UE bearers. More particularly, FIG. 7 illustrates an example of an UE with two different dedicated bearers (i.e., in addition to the default bearer that is not shown in the figure). In the example of FIG. 7, there are TFTs in UL and DL.

Bearers are used, for example, to provide different quality of service and characteristics. When a UE is active, it has a default bearer where all traffic goes. The network or the UE can initiate a secondary/dedicated bearer with a different quality and/or characteristics. The network can detect a flow that should have a dedicated bearer by inspecting the traffic, or the network can be informed by an Application Function (AF), an entity in the operator's IP services, or the network can be informed by the UE about the need for a dedicated bearer. For example, if a video session is detected, the network could then trigger the establishment of a new bearer and apply a filter to separate which traffic should go on which bearer (i.e., the TFT). This TFT is also sent to the UE so that the UE can put UL traffic on the correct bearer. In DL, TFTs are used to map/select which transport tunnel (e.g., a General Packet Radio Service (GPRS) Tunneling Protocol (GTP) tunnel) and bearer a certain flow should be sent on.

A TFT can comprise one or more of the following identifiers: Source Address and Subnet Mask; Protocol Number (IPv4)/Next Header (IPv6); Destination Port Range; Source Port Range; IPsec SPI; TOS (IPv4)/Traffic Class (IPv6) and Mask; and Flow Label (IPv6). For example, when receiving an IP packet from the Internet with a destination IP address that is the same as the UE IP address, the PDN GW will check if there is a TFT associated with the UE IP address and try to match the received IP packet with the TFT. If there is a match, the PDN GW will send the packet on the bearer associated with that TFT. A similar procedure is employed by the UE. When an UL packet sent from the higher layer parts of the UE (e.g., an Application) is received by the lower layer of the UE (e.g., where the radio protocols reside), there is a check to determine if there is a TFT that matches.

There are initiatives to use Network Assistance to improve, for example, the client throughput estimations by having mobile network interaction with the clients. One typical use case is using Network Assistance to improve QoE for adaptive bit rate video streaming applications. These approaches are described in more detail below. A functionality called Interaction Gateway is introduced in the network side for communication towards the UE (different parts of the UE). An I1-interface is introduced between the UE and the Interaction Gateway. In addition, the Interaction Gateway may have another interface, I2-interface, towards the RAN (depending on the placement of the Interaction Gateway). The Interaction Gateway can be placed either in RAN or at the S-GW interface (SGi).

FIG. 8 illustrates an example of Interaction Gateway placement with a RAN node. In the example of FIG. 8, two domains are illustrated: an Internet Domain 805 and an Operator Domain 810. Internet Domain 805 includes webportal 815 that includes application 820. Operator Domain 805 includes a wireless device 110 (e.g., a UE in the example of FIG. 8), RAN 825, and core network 830. Wireless device 110 includes an OS 835, an Interaction Application 840, a plurality of applications 845, and browser 850. RAN 825 includes Interaction Gateway 855 and a function for recommendation 860. An I1 interface provides for interaction between Interaction Application 840 of wireless device 110 and Interaction Gateway 855. An I2 interface provides for sending recommendations from function for recommendation 860 to Interaction Gateway 855.

The I1-interface is currently defined being based on user plane traffic. It may, for example, be User Data Protocol (UDP)/IP-based so that the client in wireless device 110 is able to send and receive Interaction messages. The current thinking is that a single IP address is used by the RAN nodes in one operator's network for Interaction. This approach simplifies Operations and Management (O&M) and RAN handling. In other words, the presence of this IP address (denoted RAN IP) is an indication of an Interaction message. The client in wireless device 110 can, for example, obtain this IP address by a DNS lookup. Additional measures are needed, however, as RAN 825 doesn't normally terminate user plane traffic. Therefore, RAN 825 needs to perform "sniffing" of the UL traffic to detect if a message is an Interaction message or not (i.e., was destination IP=RAN IP). When an Interaction message is identified, it is only forwarded to Interaction Gateway 855 (i.e. not towards core network 830). When Interaction Gateway 855 in RAN 825 wants to send an Interaction message to wireless device 110, it is injected in the DL traffic by RAN 825. For the use case network assistance for adaptive bit rate video streaming applications, the media client in wireless device 110 sends a Query message to RAN node 825 asking for a recommended bitrate. This query is handled by Interaction Gateway 855 which interacts with function for recommendation 860. A recommended bit rate is estimated/predicted for wireless device 110, which finally is sent in a response message back to the media client in wireless device 110. The recommended bitrate depends on a number of factors. For example, the recommended bitrate may depend on a number of wireless devices in the cell that shares the capacity, the wireless device's radio conditions, and the QoS (e.g., priority) of the bearer.

For some purposes, local breakout of traffic in RAN may be applied. In 3GPP, there is a solution called "Selected IP Traffic Offload (SIPTO) at the Local Network." This is described in section 4.3.15a of 3GPP TS 23.401 and in section 4.8 of 3GPP TS 36.300.

The SIPTO at the Local Network function enables an IP capable UE connected via a home eNB ((H)eNB) to access a defined IP network (e.g., the Internet) without the user plane traversing the mobile operator's network. The subscription data in the Home Subscriber Server (HSS) is configured per user and per APN to indicate to the MME if offload at the local network is allowed or not.

SIPTO at the Local Network can be achieved by selecting a Local Gateway (L-GW) function collocated with the (H)eNB or selecting stand-alone gateways (with S-GW and L-GW collocated) residing in the Local Network. In both cases, the selected IP traffic is offloaded via the Local Network.

FIG. 9 illustrates an example of the logical architecture for the eNB when it supports SIPTO at the Local Network with a collocated L-GW.

In order to enhance the delivery of Dynamic Adaptive Streaming over Hypertext Transfer Protocol (HTTP) (DASH) content (described in ISO/IEC 23009-1 and 3GPP TS 26.247), the part of the DASH standard on Server and Network Assisted DASH (SAND) (described in ISO/IEC 23009-5 and Clause 13 of 3GPP TS 26.247) introduces messages between DASH clients and network elements (or between various network elements) for the purpose of improving the efficiency of streaming sessions by providing information about real-time operational characteristics of networks, servers, proxies, caches, content delivery networks (CDNs) as well as the DASH client's performance and status.

FIG. 10 illustrates an example of the SAND architecture and messages. More particularly, FIG. 10 illustrates a DASH client 1005, a plurality of DASH-aware network elements (DANE) 1010a-b, and metrics server 1015. DANEs 1010a-b have at least minimum intelligence about DASH. For example, DANEs 1010a-b may be aware that delivered objects are DASH-formatted objects such as the Media Presentation Description (MPD) or DASH segments, and may prioritize, parse or even modify such objects. More details on the functionality of DANEs 1010a-b are described below. Metrics server 1015 is DASH-aware and in charge of gathering metrics from DASH clients.

In addition, the SAND reference architecture may also include regular network elements (RNE). RNEs are DASH-unaware and treat DASH delivery objects as any other object. RNEs may be present on the path between an origin server and one or more DASH clients (e.g., transparent caches).

Within the SAND architecture, four categories of messages, called SAND messages are exchanged. These four categories include Parameters Enhancing Delivery (PED) messages, Parameters Enhancing Reception (PER) messages, status messages, and metrics messages. As shown in FIG. 10, PED messages are exchanged between DANEs 1010a-b, PER messages are sent from DANEs 1010a-b to DASH client 1005, status messages are sent from DASH client 1005 to DANEs 1010a-b, and metrics messages are sent from DASH client 1005 to metrics server 1015.

SAND addresses unidirectional/bidirectional, point-to-point/multipoint communication with and without session (management) between servers/CDNs and DASH clients. SAND also addresses mechanisms for providing content-awareness and service-awareness towards the underlying protocol stack including server and/or network assistance, as well as various impacts on elements of the existing Internet infrastructure such as servers, proxies, caches and CDNs. In addition, SAND addresses QoS and QoE support for DASH-based services, and scalability in general and specifically for logging interfaces, and analytics and monitoring of DASH-based services.

As noted above, existing approaches to providing Interaction signaling between the client (e.g., in a wireless device such as a UE) and the RAN are based on user plane communication. The RAN performs sniffing of traffic to detect the Interaction signaling and excludes those packets from the user payload and sends the packets to the Interaction Gateway (located in the RAN) instead of delivering them to the Core Network. When the Interaction Gateway in the RAN wants to send an Interaction message to the UE, the message is injected as user data in the DL traffic by the RAN. These procedures, however, are not in line with the 3GPP standardized protocol layers in the RAN and Core Network, where UP channels are end-to-end entities, and where traffic can be inserted and removed only at the predesignated ends.

These procedures can impact standardized mechanisms. One example of how the procedures described above can impact standardized mechanisms involves charging and lawful interception. In both these functions, traffic must be monitored at the Core Network point that terminates the EPS bearer. However, by injecting and removing traffic at the Interaction Gateway, traffic monitoring at the Core Network becomes inaccurate as it cannot account for the extra traffic exchanged with the Interaction Gateway.

SUMMARY

To address the foregoing problems with existing approaches, disclosed is a method in a network node. The method comprises establishing a first bearer between a local breakout function gateway, the local breakout function gateway collocated at the network node, and an application client of a wireless device. The method comprises transmitting network assistance information to the wireless device over the first bearer via application-layer signaling in the user plane, the network assistance information comprising information related to optimizing transmission of user data over a second bearer established between the wireless device and a core network node.

In certain embodiments, the method may comprise associating the application-layer signaling transmitted over the first bearer with the user data transmitted over the second bearer. In certain embodiments, associating the application-layer signaling transmitted over the first bearer with the user data transmitted over the second bearer may comprise: receiving, from the application client of the wireless device, identification information enabling the network node to identify traffic related to the user data transmitted over the second bearer; inspecting data traffic on one or more bearers related to the wireless device; identifying, within the inspected data traffic based on the received identification information, traffic related to the user data transmitted over the second bearer; and associating the identified traffic related to the user data transmitted over the second bearer with the application-layer signaling transmitted over the first bearer. In certain embodiments, the identification information may comprise one or more Internet Protocol 5-tuples.

In certain embodiments, the method may comprise determining the network assistance data based on one or more criteria. The one or more criteria may comprise one or more of: a number of wireless devices in a cell associated with the network node; one or more radio conditions of the wireless device; and a quality of service associated with the second bearer. In certain embodiments, the method may comprise receiving a request for network assistance data from the wireless device over the first bearer, and determining the network assistance data based on one or more criteria in response to receiving the request. In certain embodiments, the user data transmitted over the second bearer may comprise streaming media content, the received request for network assistance data may comprise a request for a recommended rate, determining the network assistance data may comprise estimating a bit rate for the second bearer carrying the streaming media content, and transmitting the network assistance information to the wireless device may comprise transmitting the estimated bit rate for the second bearer to the wireless device over the first bearer via application-layer signaling in the user plane.

In certain embodiments, establishing the first bearer between the local breakout function gateway collocated at the network node and the application client of the wireless device may comprise defining one or more filters for routing the application-layer signaling and providing the one or more filters to the wireless device. In certain embodiments, establishing the first bearer between the local breakout function gateway collocated at the network node and the application client of the wireless device may comprise configuring an access point name at the wireless device for the first bearer and performing selected Internet Protocol traffic offload using the configured access point name for the first bearer.

In certain embodiments, the wireless device may be a user equipment.

According to another example embodiment, a network node is disclosed. The network node comprises a transmitter, a receiver, and processing circuitry coupled to the transmitter and the receiver. The processing circuitry is configured to establish a first bearer between a local breakout function gateway, the local breakout function gateway collocated at the network node, and an application client of a wireless device. The processing circuitry is configured to transmit, via the transmitter, network assistance information to the wireless device over the first bearer via application-layer signaling in the user plane, the network assistance information comprising information related to optimizing transmission of user data over a second bearer established between the wireless device and a core network node.

According to another example embodiment, a method in a wireless device is disclosed. The method comprises receiving network assistance information from a network node via application-layer signaling in the user plane over a first bearer established between a local breakout function gateway, the local breakout function gateway collocated at the network node, and an application client of the wireless device, the network assistance information comprising information related to optimizing transmission of user data over a second bearer established between the wireless device and a core network node. The method comprises receiving user data over the second bearer according to one or more parameters defined based on the received network assistance information.

In certain embodiments, the method may comprise providing identification information to the network node, the identification information for associating the application-layer signaling over the first bearer with the user data received over the second bearer. The identification information may comprise one or more Internet Protocol 5-tuples.

In certain embodiments, the method may comprise transmitting a request for network assistance data to the network node over the first bearer. In certain embodiments, the user data received over the second bearer may comprise streaming media content, the transmitted request for network assistance data may comprise a request for a recommended rate from the network node, the received network assistance data may comprise an estimated bit rate for the second bearer carrying the streaming media content, the one or more parameters may be defined based on the estimated bit rate, and the method may comprise requesting the streaming media content based on the estimated bit rate.

In certain embodiments, the method may comprise receiving one or more filters defined for routing the application-layer signaling, the one or more filters received in connection with establishing the first bearer between the local breakout function gateway collocated at the network node and the application client of the wireless device.

In certain embodiments, the method may comprise receiving a configuration for an access point name for the first bearer, the configuration for the access point name received in connection with establishing the first bearer between the local breakout function gateway collocated at the network node and the application client of the wireless device.

In certain embodiments, the application-layer signaling in the user plane over the first bearer may comprise Hypertext Transfer Protocol signaling. In certain embodiments, the wireless device may be a user equipment.

According to another example embodiment, a wireless device is disclosed. The wireless device comprises a transmitter, a receiver, and processing circuitry coupled to the transmitter and the receiver. The processing circuitry is configured to receive, via the receiver, network assistance information from a network node via application-layer signaling in the user plane over a first bearer established between a local breakout function gateway, the local breakout function gateway collocated at the network node, and an application client of the wireless device, the network assistance information comprising information related to optimizing transmission of user data over a second bearer established between the wireless device and a core network node. The processing circuitry is configured to receive, via the receiver, user data over the second bearer according to one or more parameters defined based on the received network assistance information.

Certain embodiments of the present disclosure may provide one or more technical advantages. As one example, the Interaction Gateway may be deployed as a function on the application layer, still located in a RAN node, thereby allowing it to interact with a client via user plane payload from the RAN. As another example, the Interaction Gateway may be collocated with a local breakout function gateway, thereby making it possible to use functions such as bearer establishment, routing, charging, lawful intercept, etc., for the Interaction signaling between a wireless device and the RAN. As still another example, the Interaction signaling may be performed as application layer signaling and may use transport protocol such as HTTP or HTTP Secure (HTTPS), even though it is performed in the RAN. As yet another example, the Interaction Gateway may be collocated with the RAN, advantageously allowing for direct access to information available in the RAN, such as estimated bit rate, which may be used to provide the client with network information.

As another example, in certain embodiments the client in the wireless device may provide a method for identification of the user data to the RAN, such that the bearer carrying the user data may advantageously be identified in the RAN. As another example, in certain embodiments association between the bearer carrying the user data (e.g., media) and the bearer used for Interaction signaling may be made in the RAN, such that the information collected in the RAN relates to the bearer carrying the user data and correct information of, for example, a recommended rate for a media session, may be advantageously provided to the client. As another example, in certain embodiments the Interaction Gateway may be collocated with the RAN, where the relevant information is available for providing network information to the client, as well as where actions may be performed on the service bearer, such that the QoE may be advantageously improved for the client. As another example, the Interaction Gateway may be collocated with the RAN, but on a protocol layer where application layer data is sent. As another example, the RAN may relate the Interaction signaling with the bearer of the service, such that data of the service bearer may be advantageously collected to create network information to be provided to the client. As another example, mobility of the Interaction signaling may be handled by the local breakout function gateway in the RAN, meaning that the Interaction signaling can be connected to the RAN handling the resources utilized for the bearer of the content (e.g., media content). Thus, the content communication is advantageously not impacted by the mobility of the Interaction signaling, but handled as usual.

Other advantages may be readily available to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 23 is a block schematic of an exemplary network node, in accordance with certain embodiments.

DETAILED DESCRIPTION

Figure 1:
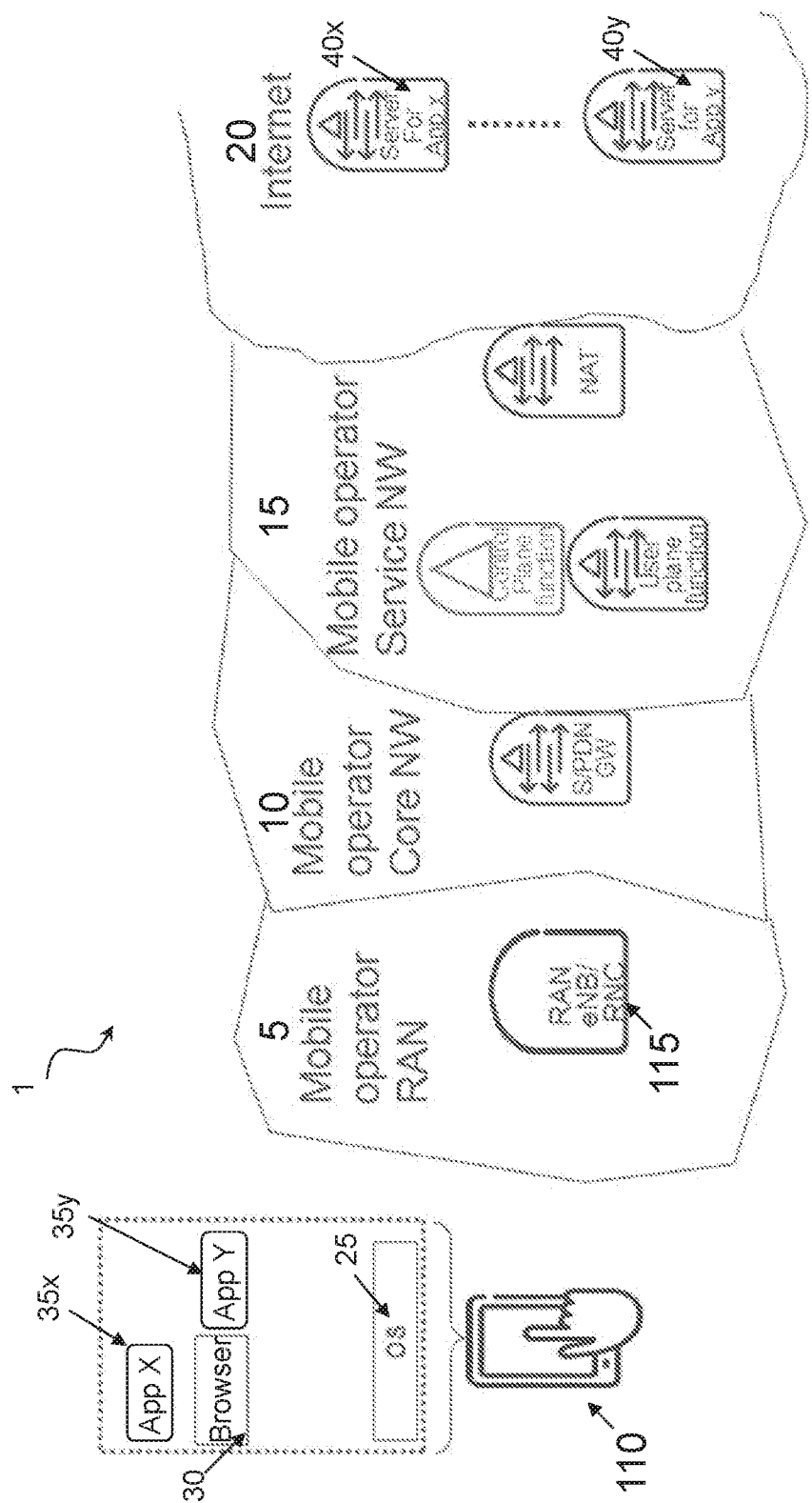
FIG. 1 is a simplified illustration of a network.
Figure 2:
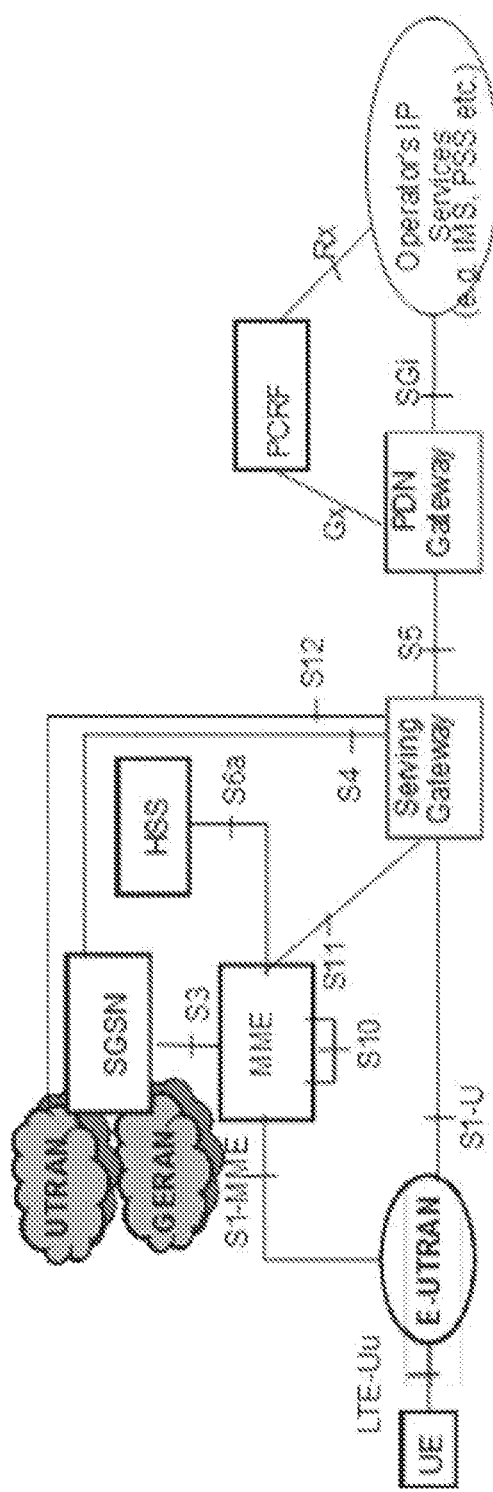
FIG. 2 illustrates an overview of the EPC architecture.
Figure 3:
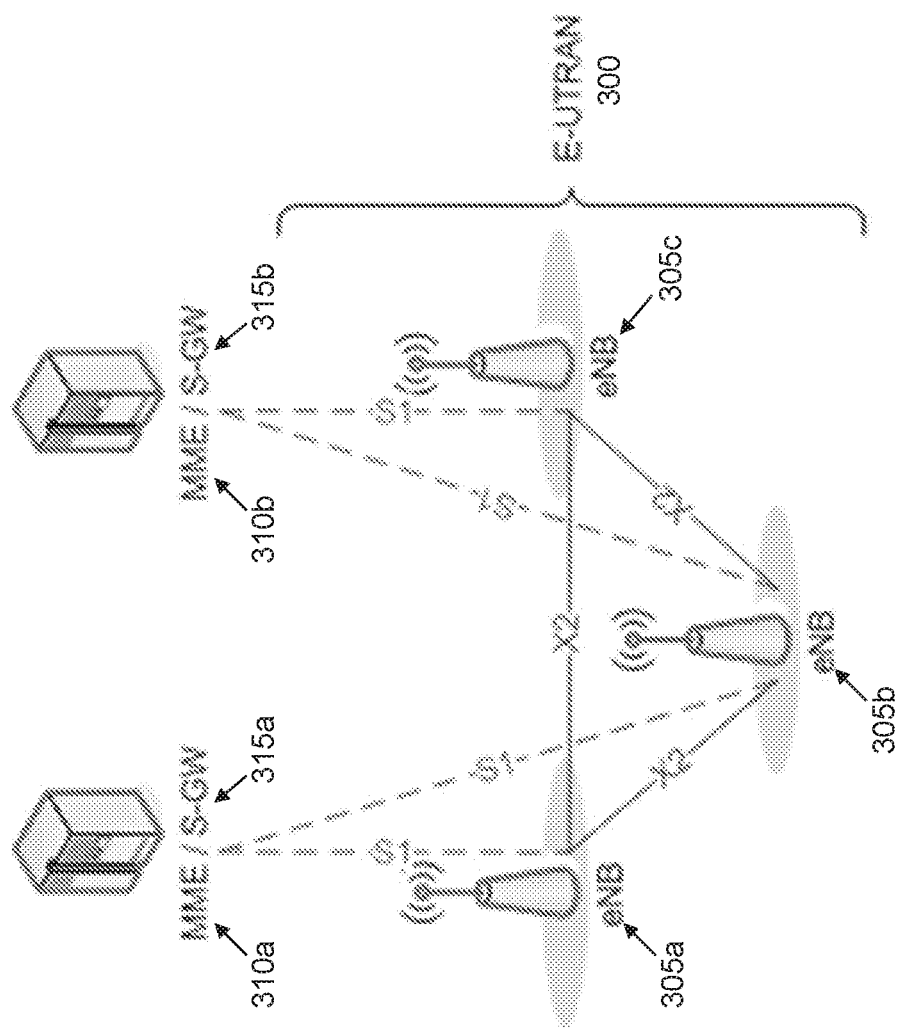
FIG. 3 illustrates an overview of the E-UTRAN overall architecture.
Figure 4:
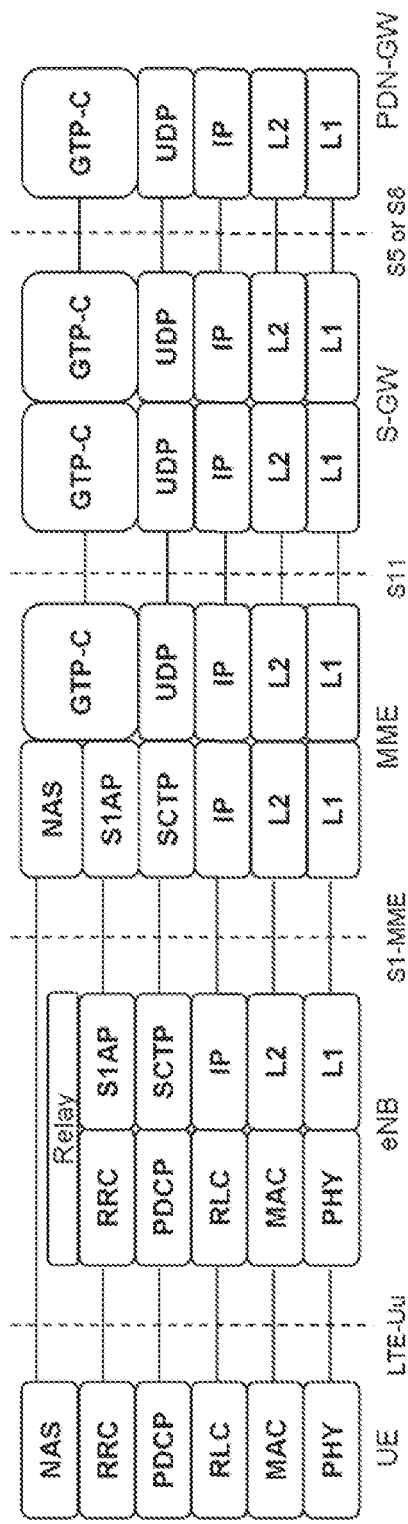
FIG. 4 illustrates an example of the EPC CP protocol architecture.
Figure 5:
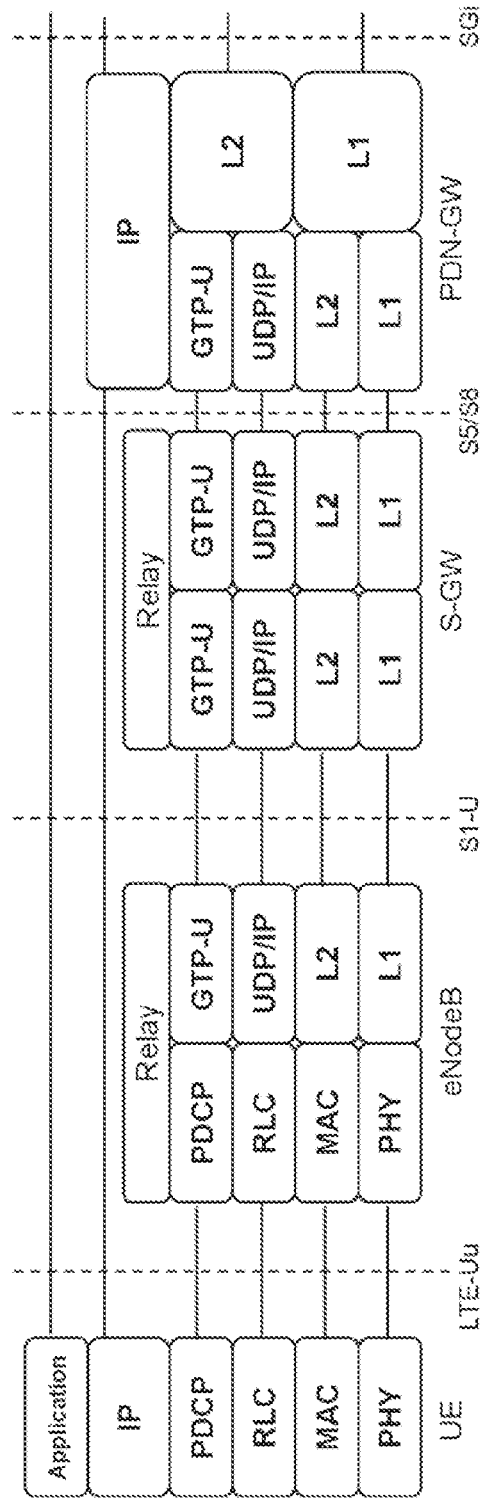
FIG. 5 illustrates an example of the EPC UP protocol architecture.
Figure 6:
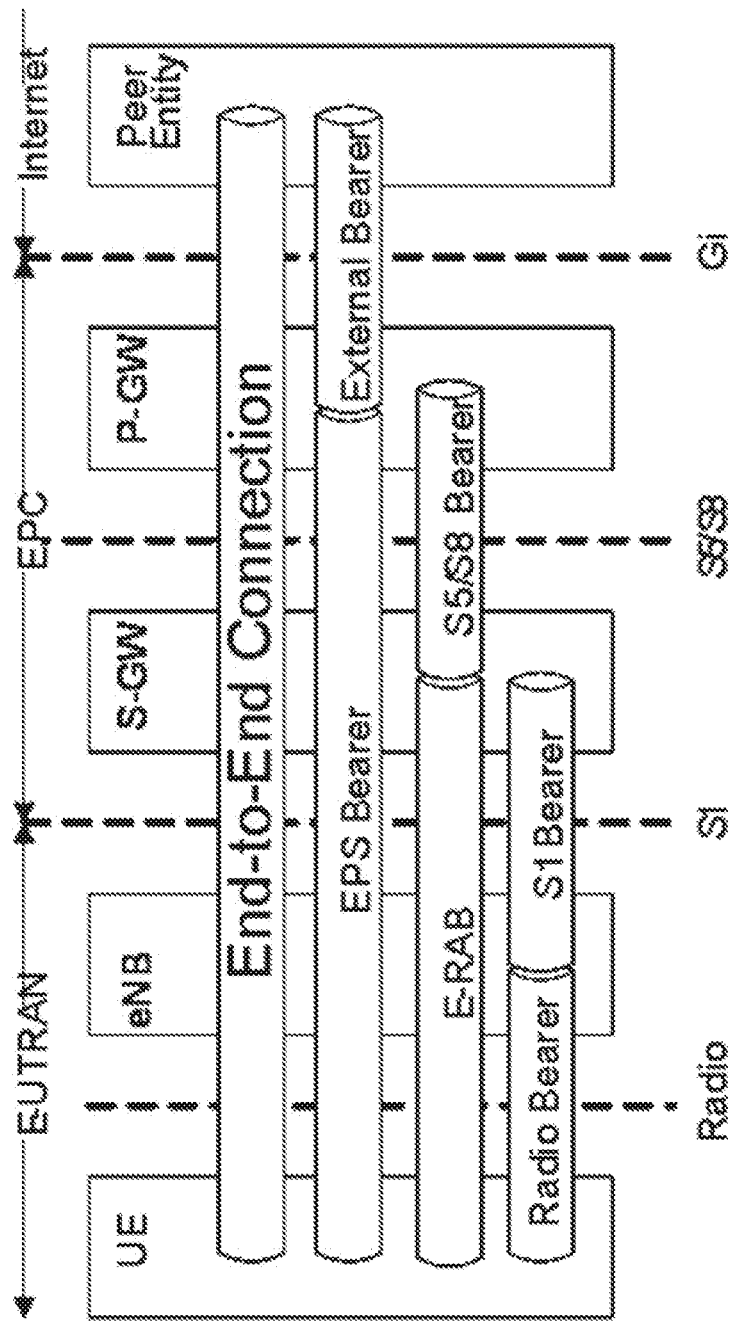
FIG. 6 illustrates an example of the EPS bearer architecture.
Figure 7:
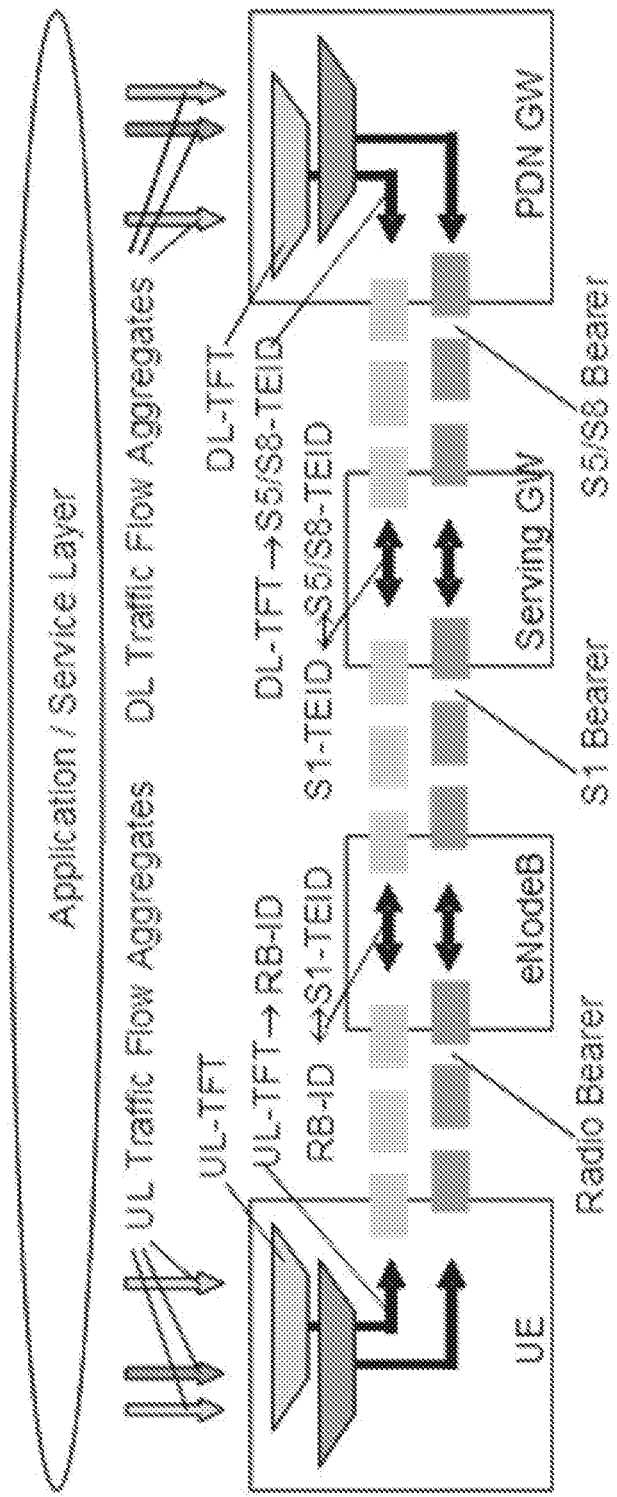
FIG. 7 illustrates an example of two UE bearers.
Figure 8:
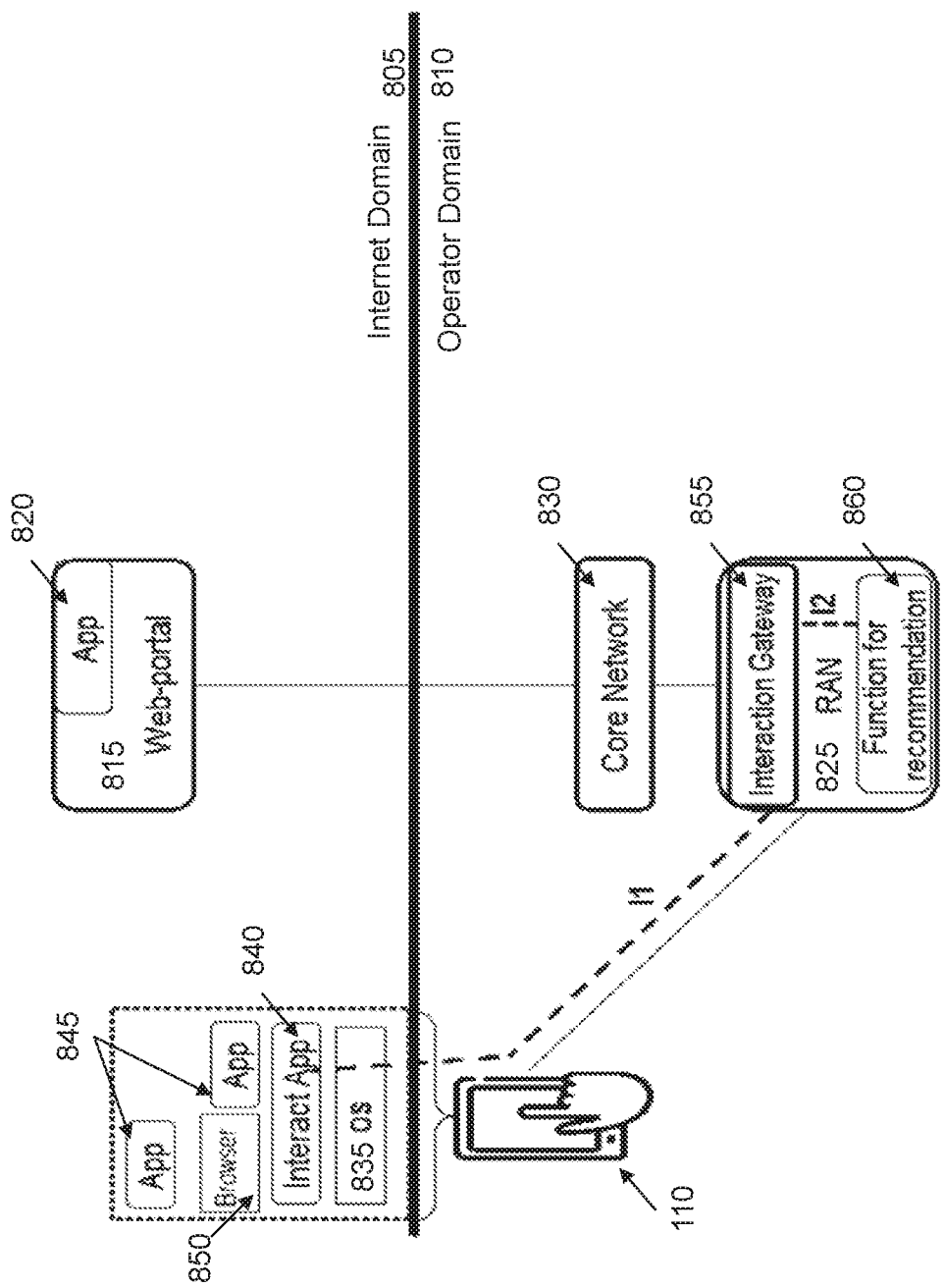
FIG. 8 illustrates an example of Interaction Gateway placement with a RAN node.
Figure 9:
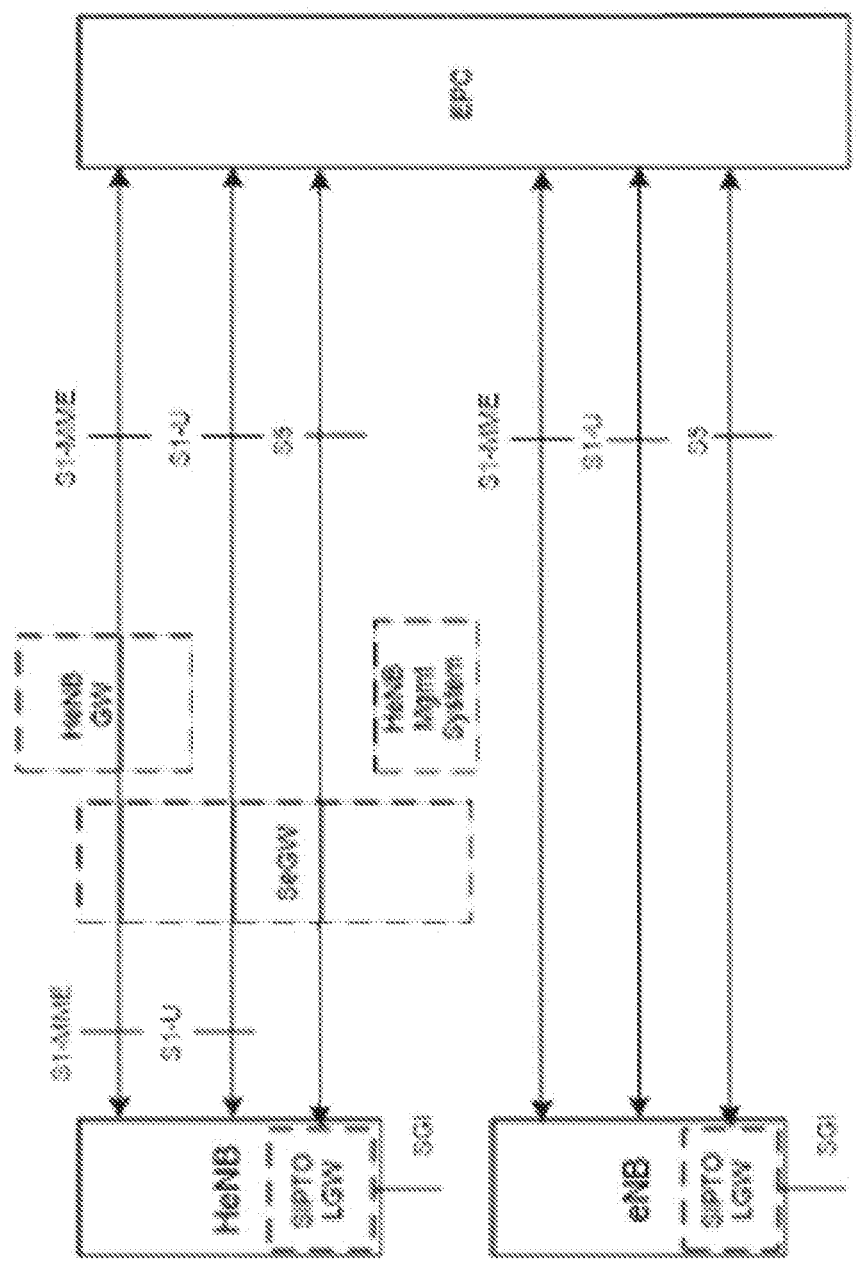
FIG. 9 illustrates an example of the logical architecture for the eNB when it supports SIPTO at the Local Network with a collocated L-GW.
Figure 10:
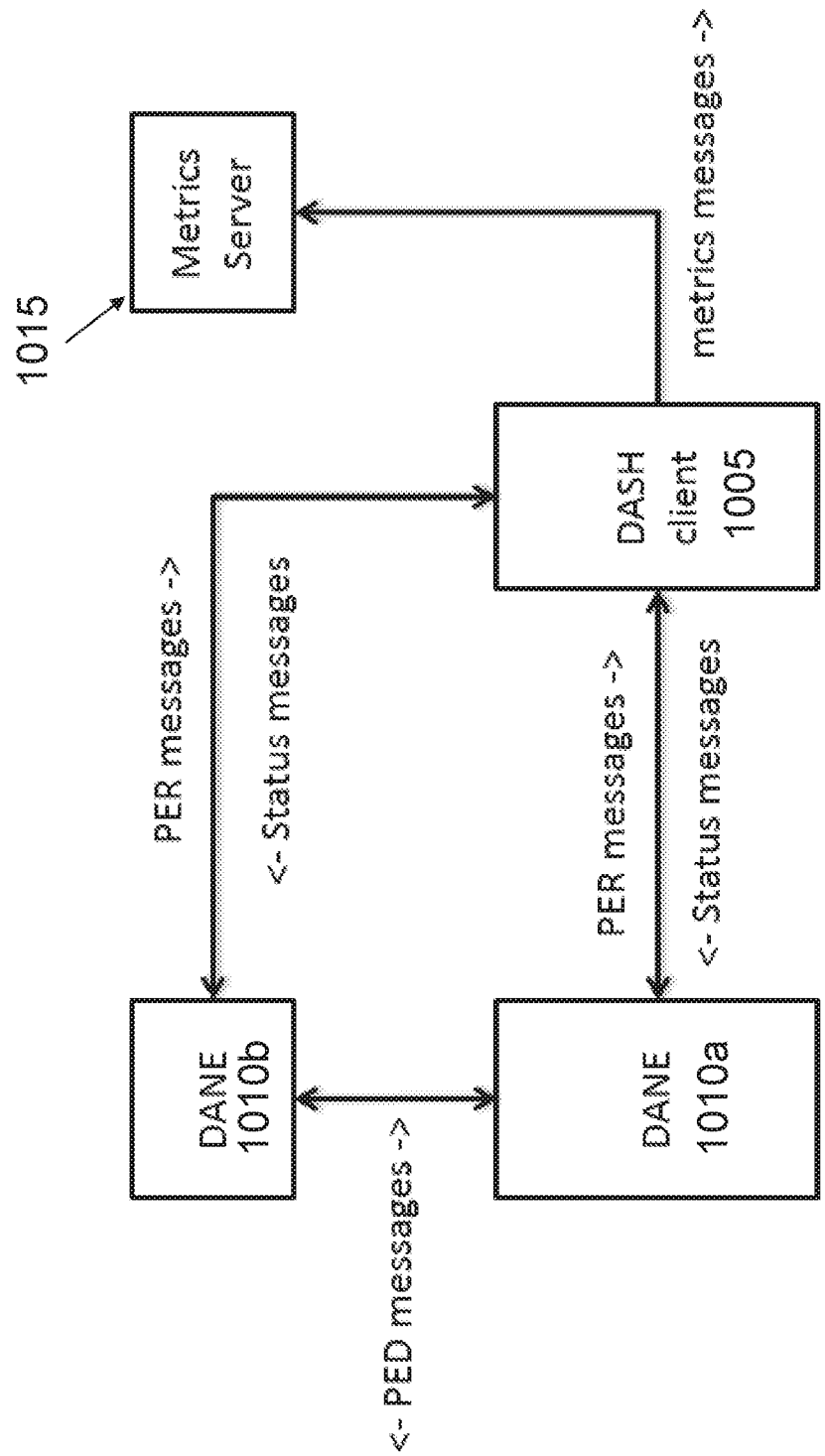
FIG. 10 illustrates an example of the SAND architecture and messages.

As described above, existing approaches to providing the Interaction signaling between the client (e.g., in a wireless device such as a UE) and the RAN are not in line with the 3GPP standardized protocol layers in the RAN and Core Network. The existing procedures have certain deficiencies and can impact standardized mechanisms, such as charging and lawful interception. Namely, by injecting and removing traffic at the Interaction Gateway, traffic monitoring at the Core Network becomes inaccurate as it cannot account for the extra traffic exchanged with the Interaction Gateway. There is no specified solution, however, where an Interaction Gateway may be deployed above the RAN protocols collocated with RAN.

A second, subsequent problem is that if the Interaction signaling were to be carried on a different bearer to the Interaction gateway than the bearer used to deliver the service in question, it must be possible to relate the interaction communication with the bearer of the service delivery. This is because, for example, the estimated bitrate depends on the priority of the bearer. This would be the case if there is a solution for Interaction signaling deployed in a RAN node as a local breakout of traffic using a separate bearer.

The present disclosure contemplates various embodiments that may address these and other deficiencies associated with existing approaches. In certain embodiments, this is achieved by a method to deploy, locally in a RAN node (e.g., in a network node such as an eNB), an Interaction Gateway used for Interaction signaling between the RAN and a client located in a wireless device (e.g., a UE), based on user plane communication for providing network information (e.g., estimated throughput) to the client. In some cases, the method may be achieved by locally collocating a local breakout function gateway, above which the Interaction Gateway is deployed as an Application server, in the RAN. The Interaction signaling is routed to the Interaction gateway via the local breakout function gateway via a separate bearer assigned for Interaction signaling or using IP routing of traffic within the bearer to the local breakout function gateway. The separate bearer may be assigned using a separate TFT provided to the UE, or using a separate APN configured in the UE, or in any other suitable manner.

The present disclosure also provides a method for how to relate the Interaction signaling with the bearer for the service, such that the network information provided to the client and the network actions are related to the bearer for the service. In certain embodiments, the method is achieved by the client providing information to the Interaction Gateway of how to identify the traffic for the service. The information for identifying the traffic for the service may, for example, comprise all or a portion of an IP 5-tuple, or any other suitable identification information. The RAN node performs inspection of the traffic of the current bearers related to the UE using Interaction signaling, such that the bearer of the service is identified. The RAN may then perform actions such as to collect data of the service bearer to be used for providing network information to the Interaction Gateway function, and subsequently provide (via the Interaction Gateway) network assistance information to the client. The RAN may also perform actions on the service bearer to assist the client in achieving better QoE.

Certain embodiments of the present disclosure may provide one or more technical advantages. As one example, the Interaction Gateway may be deployed as a function on the application layer, still located in a RAN node, thereby allowing it to interact with a client via user plane payload from the RAN. As another example, the Interaction Gateway may be collocated with a local breakout function gateway, thereby making it possible to use functions such as bearer establishment, routing, charging, lawful intercept, etc., for the Interaction signaling between a wireless device and the RAN. As still another example, the Interaction signaling may be performed as application layer signaling and may use transport protocol such as HTTP or HTTPS, even though it is performed in the RAN. As yet another example, the Interaction Gateway may be collocated with the RAN, advantageously allowing for direct access to information available in the RAN, such as estimated bit rate, which may be used to provide the client with network information.

As another example, in certain embodiments the client in the wireless device (e.g., a UE) may provide a method for identification of the user data to the RAN, such that the bearer carrying the user data may advantageously be identified in the RAN. As another example, in certain embodiments association between the bearer carrying the user data (e.g., media) and the bearer used for Interaction signaling may be made in the RAN, such that the information collected in the RAN relates to the bearer carrying the user data and correct information of, for example, a recommended rate for a media session, may be advantageously provided to the client. As another example, in certain embodiments the Interaction Gateway may be collocated with the RAN, where the relevant information is available for providing network information to the client, as well as where actions may be performed on the service bearer, such that the QoE may be advantageously improved for the client. As another example, the Interaction Gateway may be collocated with the RAN, but on a protocol layer where application layer data is sent. As another example, the RAN may relate the Interaction signaling with the bearer of the service, such that data of the service bearer may be advantageously collected to create network information to be provided to the client. As another example, mobility of the Interaction signaling may be handled by the local breakout function gateway in the RAN, meaning that the Interaction signaling can be connected (in some cases, always connected) to the RAN handling the resources utilized for the bearer of the content (e.g., media content). Thus, the content communication is advantageously not impacted by the mobility of the Interaction signaling, but handled as usual.

Other advantages may be readily available to one having skill in the art. Certain embodiments may have none, some, or all of the recited advantages.

Figure 11:
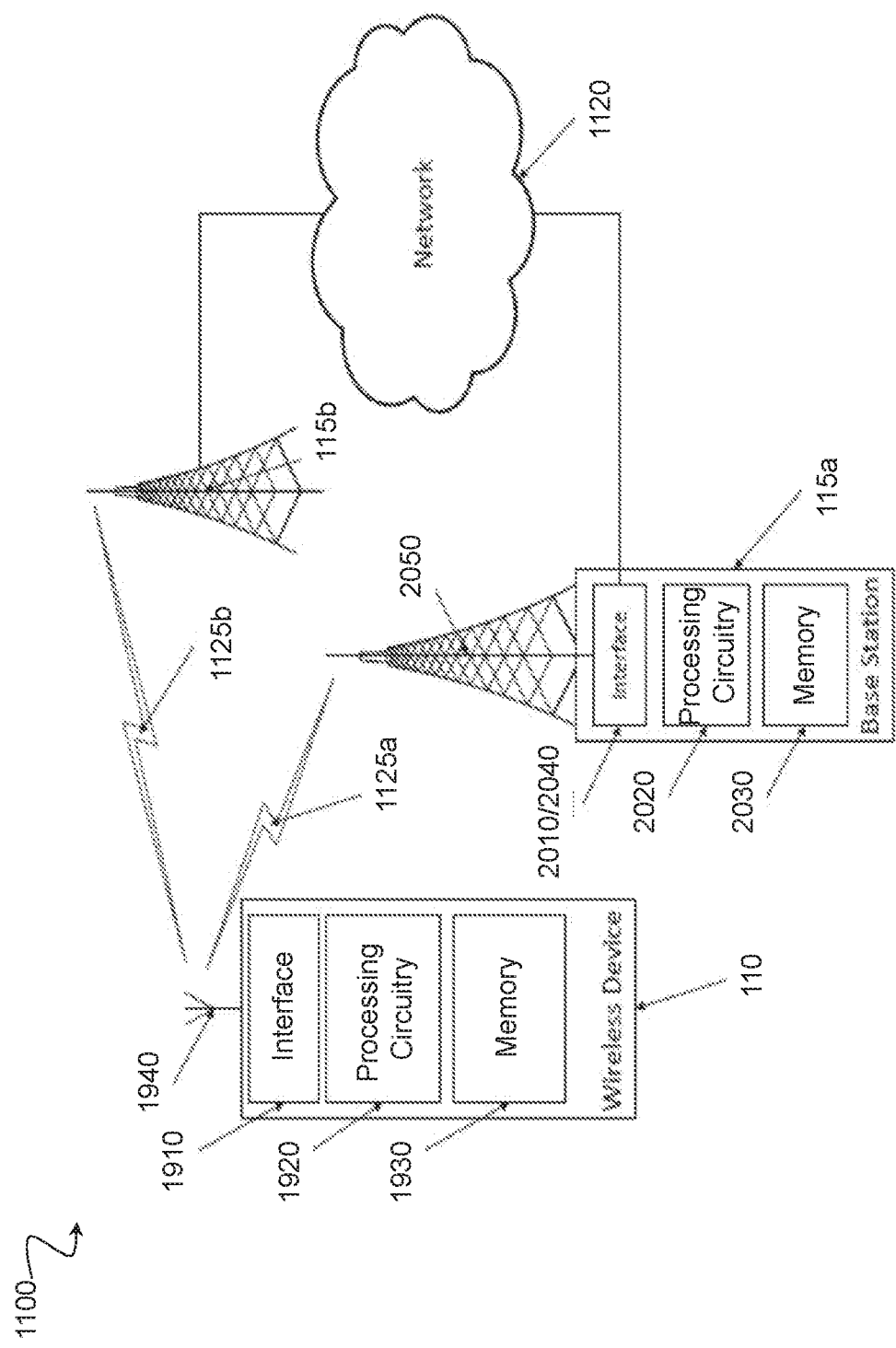
FIG. 11 is a block diagram illustrating an embodiment of a network, in accordance with certain embodiments.

FIG. 11 is a block diagram illustrating an embodiment of a network 1100, in accordance with certain embodiments. Network 1100 includes one or more wireless devices 110 and one or more network node(s) 115 (including network nodes 115*a* and 115*b* in the example embodiment of FIG. 11). Network node 115*a* comprises processing circuitry 2020, memory 2030, interface 2010/2040, and antenna 2050. Wireless device 110 comprises processing circuitry 1920, memory 1930, interface 1910 and antenna 1940. These components may work together in order to provide network node and/or wireless device functionality, such as providing wireless connections in network 1100.

For example, wireless devices 110 may communicate with network nodes 115 over a wireless interface. For example, wireless device 110 may transmit wireless signals 1125*a*, 1125*b* to one or more of network nodes 115, and/or receive wireless signals 1125*a*, 1125*b* from one or more of network nodes 115. Wireless signals 1125*a*, 1125*b* may contain voice traffic, data traffic, control signals, and/or any other suitable information. In some embodiments, an area of wireless signal coverage associated with a network node 115 may be referred to as a cell. In some embodiments, wireless device 110 may have device-to-device (D2D) capability. Thus, wireless devices 110 may be able to receive signals from and/or transmit signals directly to another wireless device.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 1120. Interconnecting network 1120 may refer to any interconnecting system capable of transmitting audio, video, signals, data, messages, or any combination of the preceding. Interconnecting network 1120 may include all or a portion of one or more Internet Protocol (IP) networks, public switched telephone networks (PSTNs), packet data networks, optical networks, public or private data networks, local area networks (LANs), wireless local area networks (WLANs), wired networks, wireless networks, metropolitan area networks (MANs), wide area networks (WAN), a local, regional, or global communication or computer network such as the Internet, an enterprise intranet, or any other suitable communication links, including combinations thereof, to enable communication between devices.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the RAN. In certain embodiments, network nodes 115 may interface with one or more network nodes over an internode interface, such as, for example, an X2 interface.

As described above, example embodiments of network 1100 may include one or more wireless devices 110, and one or more different types of network nodes 115 capable of communicating (directly or indirectly) with wireless devices 110.

In some embodiments, the non-limiting term wireless device is used. Wireless devices 110 described herein can be any type of wireless device capable, configured, arranged and/or operable to communicate wirelessly with network nodes 115 and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, UEs such as smart phones. Further examples include wireless cameras, wireless-enabled tablet computers, laptop-embedded equipment (LEE), laptop-mounted equipment (LME), USB dongles, and/or wireless customer-premises equipment (CPE). Wireless device 110 may also be a radio communication device, target device, D2D UE, machine-type-communication (MTC) UE or UE capable of machine-to-machine (M2M) communication, low-cost and/or low-complexity UE, a sensor equipped with UE, or any other suitable devices.

As one specific example, wireless device 110 may represent a UE configured for communication in accordance with one or more communication standards promulgated by 3GPP, such as 3GPP's GSM, UMTS, LTE, and/or 5G standards. As used herein, a "UE" may not necessarily have a "user" in the sense of a human user who owns and/or operates the relevant device. Instead, a UE may represent a device that is intended for sale to, or operation by, a human user but that may not initially be associated with a specific human user.

Wireless device 110 may support D2D communication, for example by implementing a 3GPP standard for sidelink communication, and may in this case be referred to as a D2D communication device.

As yet another specific example, in an Internet of Things (IOT) scenario, a wireless device may represent a machine or other device that performs monitoring and/or measurements, and transmits the results of such monitoring and/or measurements to another wireless device and/or a network node. The wireless device may in this case be a M2M device, which may in a 3GPP context be referred to as a MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, personal wearables such as watches, etc.). In other scenarios, a wireless device may represent a vehicle or other equipment that is capable of monitoring and/or reporting on its operational status or other functions associated with its operation.

Wireless device 110 as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 11, wireless device 110 may be any type of wireless endpoint, mobile station, mobile phone, wireless local loop phone, smartphone, UE, desktop computer, PDA, cell phone, tablet, laptop, VoIP phone or handset, which is able to wirelessly send and receive data and/or signals to and from a network node, such as network node 115 and/or other wireless devices. Wireless device 110 comprises processing circuitry 1920, memory 1930, interface 1910, and antenna 1940. The components of wireless device 110 are depicted as single boxes located within a single larger box, however in practice a wireless device may comprise multiple different physical components that make up a single illustrated component (e.g., memory 1930 may comprise multiple discrete microchips, each microchip representing a portion of the total storage capacity).

Processing circuitry 1920 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 110 components, such as memory 1930, wireless device 110 functionality. Such functionality may include providing various wireless features discussed herein, including any of the features or benefits disclosed herein.

Memory 1930 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Memory 1930 may store any suitable data, instructions, or information, including software and encoded logic, utilized by wireless device 110. Memory 1930 may be used to store any calculations made by processing circuitry 1920 and/or any data received via interface 1910.

Interface 1910 may be used in the wireless communication of signaling and/or data between wireless device 110 and network nodes 115. For example, interface 1910 may perform any formatting, coding, or translating that may be needed to allow wireless device 110 to send and receive data from network nodes 115 over a wireless connection. Interface 1910 may also include a radio transmitter and/or receiver that may be coupled to or a part of antenna 1940. The radio may receive digital data that is to be sent out to network nodes 115 via a wireless connection. The radio may convert the digital data into a radio signal having the appropriate channel and bandwidth parameters. The radio signal may then be transmitted via antenna 1940 to network nodes 115.

Antenna 1940 may be any type of antenna capable of transmitting and receiving data and/or signals wirelessly. In some embodiments, antenna 1940 may comprise one or more omni-directional, sector or panel antennas operable to transmit/receive radio signals between, for example, 2 GHz and 66 GHz. In some embodiments, antenna 1940 may be able to transmit/receive signals outside this range. As one example, an antenna 1940 operating in a 5G system may support transmission/reception at lower frequencies (e.g., as low as 400 MHz). For simplicity, antenna 1940 may be considered a part of interface 1910 to the extent that a wireless signal is being used.

Also, in some embodiments generic terminology, "network node" is used. As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, evolved Node Bs (eNBs), and gNBs. Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs, etc.), Operation and Maintenance (O&M) nodes, Operations Support System (OSS) nodes, Self-Organizing Network (SON) nodes, positioning nodes (e.g., Evolved Serving Mobile Location Center (E-SMLCs)), minimization of drive tests (MDTs), or any other suitable network node. More generally, however, network nodes may represent any suitable device (or group of devices) capable, configured, arranged, and/or operable to enable and/or provide a wireless device access to the wireless communication network or to provide some service to a wireless device that has accessed the wireless communication network.

In FIG. 11, network node 115*a* comprises processing circuitry 2020, memory 2030, interface 2010/2040, and antenna 2050. These components are depicted as single boxes located within a single larger box. In practice, however, network node 115*a* may comprise multiple different physical components that make up a single illustrated component (e.g., interface 2010/2040 may comprise terminals for coupling wires for a wired connection and a radio transceiver for a wireless connection). As another example, network node 115*a* may be a virtual network node in which multiple different physically separate components interact to provide the functionality of network node 115*a* (e.g., processing circuitry 2020 may comprise three separate processors located in three separate enclosures, where each processor is responsible for a different function for a particular instance of network node 115*a*). Similarly, network node 115*a* may be composed of multiple physically separate components (e.g., a NodeB component and a RNC component, a BTS component and a BSC component, etc.), which may each have their own respective processor, storage, and interface components. In certain scenarios in which network node 115*a* comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 115*a* may be configured to support multiple radio access technologies (RATs). In such embodiments, some components may be duplicated (e.g., separate memory 2030 for the different RATs) and some components may be reused (e.g., the same antenna 2050 may be shared by the RATs).

Processing circuitry 2020 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 115*a* components, such as memory 2030, network node 115*a* functionality. For example, processing circuitry 2020 may execute instructions stored in memory 2030. Such functionality may include providing various wireless features discussed herein to one or more wireless devices, such as wireless device 110, including any of the features or benefits disclosed herein.

Memory 2030 may comprise any form of volatile or non-volatile computer readable memory including, without limitation, persistent storage, solid state memory, remotely mounted memory, magnetic media, optical media, RAM, ROM, removable media, or any other suitable local or remote memory component. Memory 2030 may store any suitable instructions, data or information, including software and encoded logic, utilized by network node 115*a*. Memory 2030 may be used to store any calculations made by processor 2020 and/or any data received via interface 2010/2040.

Network node 115*a* also comprises interface 2010/2040 which may be used in the wired or wireless communication of signaling and/or data between network node 115*a*, network 115*b*, and/or wireless device 110. For example, interface 2010/2040 may perform any formatting, coding, or translating that may be needed to allow network node 115*a* to send and receive data from network 115*b* over a wired connection. Interface 2010/2040 may also include a radio transmitter and/or receiver that may be coupled to or a part of antenna 2050. The radio may receive digital data that is to be sent out to other network nodes or wireless devices via a wireless connection. The radio may convert the digital data into a radio signal having the appropriate channel and bandwidth parameters. The radio signal may then be transmitted via antenna 2050 to the appropriate recipient (e.g., wireless device 110).

Antenna 2050 may be any type of antenna capable of transmitting and receiving data and/or signals wirelessly. In some embodiments, antenna 2050 may comprise one or more omni-directional, sector or panel antennas operable to transmit/receive radio signals between, for example, 2 GHz and 66 GHz. In some embodiments, antenna 2050 may be able to transmit/receive signals outside this range. As one example, an antenna 2050 operating in a 5G system may support transmission/reception at lower frequencies (e.g., as low as 400 MHz). An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, the term "radio node" is used generically to refer both to wireless devices and network nodes, as each is respectively described above.

The terminology such as network node and wireless device should be considered non-limiting and does in particular not imply a certain hierarchical relation between the two; in general "network node" could be considered as device 1 and "wireless device" device 2, and these two devices communicate with each other over some radio channel.

Example embodiments of wireless device 110, network nodes 115, and other network nodes (such as radio network controller or core network node) are described in more detail below with respect to FIGS. 18-23.

Although FIG. 11 illustrates a particular arrangement of network 1100, the present disclosure contemplates that the various embodiments described herein may be applied to a variety of networks having any suitable configuration. For example, network 1100 may include any suitable number of wireless devices 110 and network nodes 115, as well as any additional elements suitable to support communication between wireless devices or between a wireless device and another communication device (such as a landline telephone). In different embodiments, the wireless network 1100 may comprise any number of wired or wireless networks, network nodes, base stations, controllers, wireless devices, relay stations, and/or any other components that may facilitate or participate in the communication of data and/or signals whether via wired or wireless connections.

Furthermore, although certain embodiments may be described as implemented in a LTE network, the embodiments may be implemented in any appropriate type of telecommunication system using any suitable components, and are applicable to any RAT or multi-RAT systems where network assistance information can be provided to an application client in order to optimize QoE at the end user. For example, the various embodiments described herein may be applicable to LTE, LTE-Advanced, NR, 5G, UMTS, HSPA, GSM, cdma2000, WCDMA, WiMax, UMB, WiFi, another suitable RAT, or any suitable combination of one or more RATs. Thus, network 100 may represent any type of communication, telecommunication, data, cellular, and/or radio network or other type of system. In particular embodiments, the network 100 may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Although certain embodiments may be described in the context of wireless transmissions in the DL, the present disclosure contemplates that the various embodiments are equally applicable in the UL.

Although the solutions described herein may be implemented in any appropriate type of system using any suitable components, particular embodiments of the described solutions may be implemented in a wireless network such as the example wireless communication network illustrated in FIG. 11. In the example embodiment of FIG. 11, the wireless communication network provides communication and other types of services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Some of the embodiments contemplated herein will now be described more fully hereinafter with reference to the accompanying drawings. Other embodiments, however, are contained within the scope of this disclosure and should not be construed as limited to only the embodiments set forth herein; rather, these embodiments are provided by way of example to convey the scope of the concept to those skilled in the art. Like numbers refer to like elements throughout the description.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

As described above, the present disclosure provides a method to locally in RAN deploy an Interaction Gateway, used for Interaction signaling between the RAN and a client located in a UE, as a local breakout function including a gateway. In certain embodiments, the Interaction signaling is based on user plane communication (e.g., HTTP) for providing network assistance information to the client. In certain embodiments, the Interaction signaling is carried over a bearer terminating in the local breakout function gateway, independent of the bearer carrying the user payload data. The present disclosure also provides a method for how to relate the Interaction signaling with the bearer carrying the user data (e.g., media content) for the service, such that the network assistance information provided to the client and the network actions derived from the assistance information are related to the bearer carrying the user data (e.g., media content) for the service.

According to one example embodiment, a network node, such as network node 115a, establishes a first bearer between a local breakout function gateway and an application client of wireless device 110. In certain embodiments, the local breakout function gateway is collocated at network node 115a. Network node 115a may establish the first bearer between the local breakout function and the application client of wireless device 110 in any suitable manner. As one example, network node 115a may establish the first bearer between the local breakout function gateway (which may be collocated at network node 115a) and the application client of wireless device 110 by defining one or more filters for routing the application-layer signaling, and providing the one or more filters to wireless device 110. In such a scenario, wireless device 110 receives the one or more filters defined for routing the application-layer signaling in connection with establishing the first bearer between the local breakout function gateway collocated at the network node and the application client of the wireless device.

As another example, in certain embodiments network node 115*a* may establish the first bearer between the local breakout function gateway and the application client of wireless device 110 by configuring an access point name at wireless device 110 for the first bearer, and performing selected Internet Protocol traffic offload using the configured access point name for the first bearer. In such a scenario, wireless device 110 may receive a configuration for an access point name for the first bearer in connection with establishing the first bearer between the local breakout function gateway collocated at the network node and the application client of the wireless device.

Network node 115*a* transmits network assistance information to wireless device 110 over the first bearer via application-layer signaling in the user plane. The application-layer signaling in the user plane may, for example, be HTTP or HTTPS signaling. The network assistance information includes information related to optimizing transmission of user data over a second bearer established between wireless device 110 and a core network node. The network assistance information may be any suitable information. In certain embodiments, the network assistance information may be a recommended rate. In certain embodiments, the network assistance information may be one or more other parameters related to optimizing transmission of user data over the second bearer established between wireless device 110 and a core network node.

The first bearer between the local breakout function gateway and the application client of wireless device 110 and the second bearer established between wireless device 110 and a core network node may be established in any order, and the order in which the first and second bearers are established may vary according to different implementations. For example, in certain embodiments the first bearer between the local breakout function gateway and the application client of wireless device 110 may be established before the second bearer is established between wireless device 110 and the core network node. As another example, in certain embodiments the second bearer may be established between wireless device 110 and the core network node before the first bearer is established between the local breakout function gateway and the application client of wireless device 110. As still another example, in certain embodiments the first bearer between the local breakout function gateway and the application client of wireless device 110 may be established at the same time as the second bearer between wireless device 110 and the core network node.

In certain embodiments, network node 115*a* may determine the network assistance data based on one or more criteria. The one or more criteria may be any suitable criteria. For example, in certain embodiments network node 115*a* may determine the network assistance information based on one or more of a number of wireless devices 110 in a cell associated with network node 115*a*, one or more radio conditions of wireless device 110; and a quality of service associated with the second bearer.

In certain embodiments, wireless device 110 may transmit a request for network assistance data to network node 115*a* over the first bearer. In such a scenario, network node 115*a* receives the request for network assistance data from wireless device 110 over the first bearer. Network node 115*a* may determine the network assistance data based on one or more criteria in response to receiving the request.

Wireless device 110 receives the network assistance information from network node 115*a* via application-layer signaling in the user plane over the first bearer established between a local breakout function gateway and the application client of the wireless device 110. As noted above, the local breakout function gateway may be collocated at network node 115*a*. The network assistance information includes information related to optimizing transmission of user data over the second bearer established between wireless device 110 and a core network node. Wireless device 110 receives the user data over the second bearer according to one or more parameters defined based on the received network assistance information.

In certain embodiments, network node 115*a* associates the application-layer signaling transmitted over the first bearer with the user data transmitted over the second bearer. The association of the application-layer signaling transmitted over the first bearer with the user data transmitted over the second bearer may be accomplished in any suitable manner. As one non-limiting example, wireless device 110 may provide identification information to network node 115. The identification information may be used by network node 115*a* to associate the application-layer signaling over the first bearer with the user data received over the second bearer. For example, network node 115*a* may associate the application-layer signaling transmitted over the first bearer with the user data transmitted over the second bearer by receiving, from the application client of wireless device 110, the identification information enabling network node 115*a* to identify traffic related to the user data transmitted over the second bearer. Network node 115*a* inspects data traffic on one or more bearers related to wireless device 110, and identifies, within the inspected data traffic based on the received identification information, traffic related to the user data transmitted over the second bearer. Network node 115*a* associates the identified traffic related to the user data transmitted over the second bearer with the application-layer signaling transmitted over the first bearer. The identification information may be any suitable information. For example, the identification information may be or include a 5-tuple, part of a 5-tuple (such as a port number), a 4-tuple (e.g., client IP, client port, server IP and protocol ID), a client IP and/or server SNI, marked packets, and/or some other kind of marking/identity of the media packets.

In certain embodiments, multiple HTTP flows may be carried on the second bearer. For example, in some cases adaptive bit rate offerings separate audio, video and other information onto separate HTTP flows. Thus, in some cases the second bearer may gather all media related HTTP flows (for example, 5-Tuple sequences).

In certain embodiments, the user data transmitted over the second bearer may be streaming media content. In such a scenario, the request for network assistance data may be a request for a recommended rate. In determining the network assistance data, network node 115*a* may estimate a bit rate for the second bearer carrying the streaming media content, and transmit the estimated bit rate for the second bearer to wireless device 110 over the first bearer via application-layer signaling in the user plane. Wireless device 110 may receive the user data over the second bearer according to one or more parameters defined based on the estimated bit rate, and request the streaming media content based on the estimated bit rate.

Figure 12:
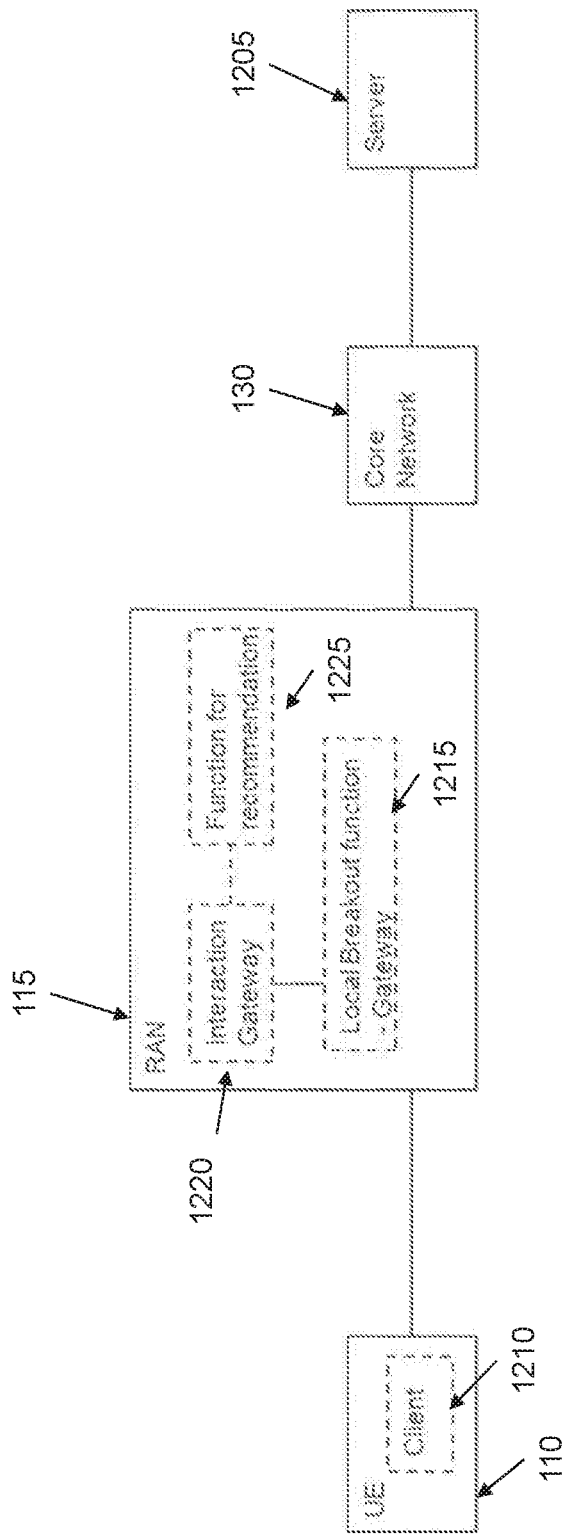
FIG. 12 illustrates an example architecture for network assistance via a local breakout function gateway in the RAN, in accordance with certain embodiments.

FIG. 12 illustrates an example architecture for network assistance via a local breakout function gateway in the RAN, in accordance with certain embodiments. In the example of FIG. 12, a wireless device 110 (e.g., a UE in the example of FIG. 12) is illustrated along with a network node 115 (denoted RAN in the example of FIG. 12), a core network gateway 130, and a server 1205. Wireless device 110 includes a client 1210. Network node 115 includes local breakout function gateway 1215, Interaction Gateway 1220, and function for recommendation 1225.

In the example architecture of FIG. 12, local breakout function gateway 1215 is locally collocated in network node 115. Above local breakout function gateway 1215, Interaction Gateway 1220 is deployed as an Application server in the RAN. The Interaction signaling is routed to Interaction gateway 1220 via local breakout function gateway 1215 via a separate bearer assigned for Interaction signaling or using IP routing of traffic within the bearer to local breakout function gateway 1215.

Function for recommendation 1225 can calculate network assistance information. For example, in certain embodiments function for recommendation 1225 may calculate a recommended rate for media content (e.g., audio and/or video content). In some cases, the calculation is based on the available resources at the RAN and/or other suitable criteria. The determined network assistance information can be injected in a dedicated bearer that breaks out at the RAN node 115 and that transports this network assistance information to the client 1210 (e.g., a media client). As described above in relation to FIG. 11, the network assistance information may be provided to client 1210 after client 1210 has requested for such information via a request message. In certain embodiments, the request message may be sent as UP traffic over the break out bearer terminating at local breakout function 1215 in the RAN node 115.

Although the local breakout function gateway 1215, Interaction Gateway 1220, and function for recommendation 1225 are depicted within a single box denoting network node 115, other arrangements are possible.

A possible deployment of an interaction communication between client 1210 and Interaction Gateway 1220 is the Server and Network Assisted DASH (SAND) multimedia services. SAND is described in more detail in section 13.6 of 3GPP TS 26.247. In such a scenario, Interaction Gateway 1220 could then be implemented as a DANE and the Interaction signaling may be implemented as PER and Status messages. In other words, in certain embodiments the DANE could be located as a function of the network node 115 (e.g., an eNB), thereby allowing the DANE function to use recommended rate information based on RAN resource awareness. To allow the network assistance information (e.g., recommended rate) to be provided by the DANE to a DASH Client via HTTP data, the DANE at network node 115 can inject such network assistance information as UP payload towards the wireless device (hosting the DASH Client). The latter can be achieved by using the local breakout function at network node 115 as described herein, which terminates UP bearers at network node 115 and allows a function such as the DANE to inject UP data traffic directly in the breakout bearers so that such traffic (containing DASH assistance information) can reach the wireless device at application layer. In certain embodiments, the local breakout bearer may be used only to send to the DASH client network assistance information from the DANE. This information may be independent from the payload of the DASH media content, which can be sent to the DASH Client via classic UP bearers carrying content from the DASH Server.

Such an approach would allow the DANE to be a function of network node 115 and to be directly provided with information on predicted rate for a given service, which is based on what the RAN node 115 can monitor. For example, such information could be based on estimated resources available and available throughput for a given service. As the DANE needs to communicate at HTTP level with the DASH Client, the information can be injected into a UP bearer that breaks out locally to the RAN node 115. The local breakout regards network assistance information and would not affect media content traffic, which is provided by a DASH server. The DASH Client would receive the network assistance information via UP bearer traffic. The client will be able to use this information for DASH media rate prediction, leading to an optimized DASH audio/video QoE. Allowing the transmission of network assistance information via the UP reduces the signaling load over the air and eliminates the impact on other protocols and specifications such as RRC.

Figure 13:
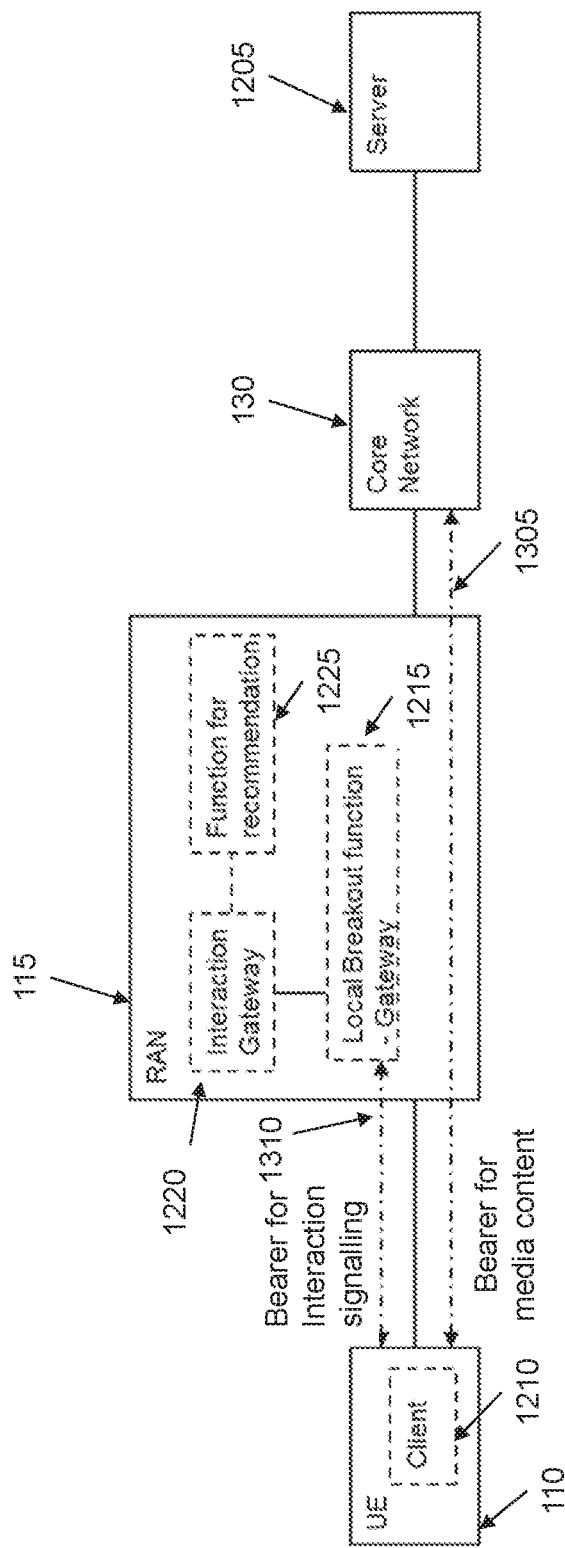
FIG. 13 illustrates an example bearer configuration, in accordance with certain embodiments.

FIG. 13 illustrates an example bearer configuration, in accordance with certain embodiments. Similar to FIG. 12 described above, FIG. 13 shows a wireless device 110 (e.g., a UE in the example of FIG. 13), a network node 115 (denoted RAN in the example of FIG. 13), a core network gateway 130, and a server 1205. Wireless device 110 includes client 1210. Network node 115 includes local breakout function gateway 1215, Interaction Gateway 1220, and function for recommendation 1225.

In the example architecture of FIG. 13, local breakout function gateway 1215 is locally collocated in network node 115. Above local breakout function gateway 1215, Interaction Gateway 1220 is deployed as an Application server in the RAN. The Interaction signaling is routed to Interaction gateway 1220 via local breakout function gateway 1215 via a separate bearer assigned for Interaction signaling or using IP routing of traffic within the bearer to local breakout function gateway 1215.

In addition, FIG. 13 illustrates the bearers used for data and Interaction signaling, respectively. More particularly, in the example of FIG. 13 there is one bearer 1305 used for the media content. Bearer 1305 is connected to Core Network Gateway 130. Bearer 1310 is used for the Interaction signaling. Bearer 1310 is connected to local breakout function gateway 1215 in the RAN node 115.

As described above, routing the Interaction signaling on a separate bearer 1310 to local breakout function gateway 1215 destined to Interaction Gateway 1220 may be accomplished in a variety of ways. As one non-limiting example, the routing can be accomplished by defining separate filters (e.g., TFTs) for Interaction Gateway 1220 to route the Interaction signaling via separate bearer 1310 to a locally deployed Application server. In certain embodiments, the filters may be provided to wireless device 110 at, for example, bearer establishment. As another non-limiting example, SIPTO at the Local network may be used. In such a scenario, SIPTO at the Local network may be employed by using a separate APN for the local traffic, to direct the local traffic via a separate bearer to a locally deployed Application server. In certain embodiments, the APN may be configured in wireless device 110.

One example of a use case for the various embodiments described herein is network assistance for adaptive bit rate video streaming Such an example use case will be described below in relation to FIGS. 14-15. The network interacts with the media client in the wireless device (e.g., a UE) and provides network information such as recommended rate to the media client. The media client uses the recommended rate information when selecting a media representation for the next download.

Figure 14:
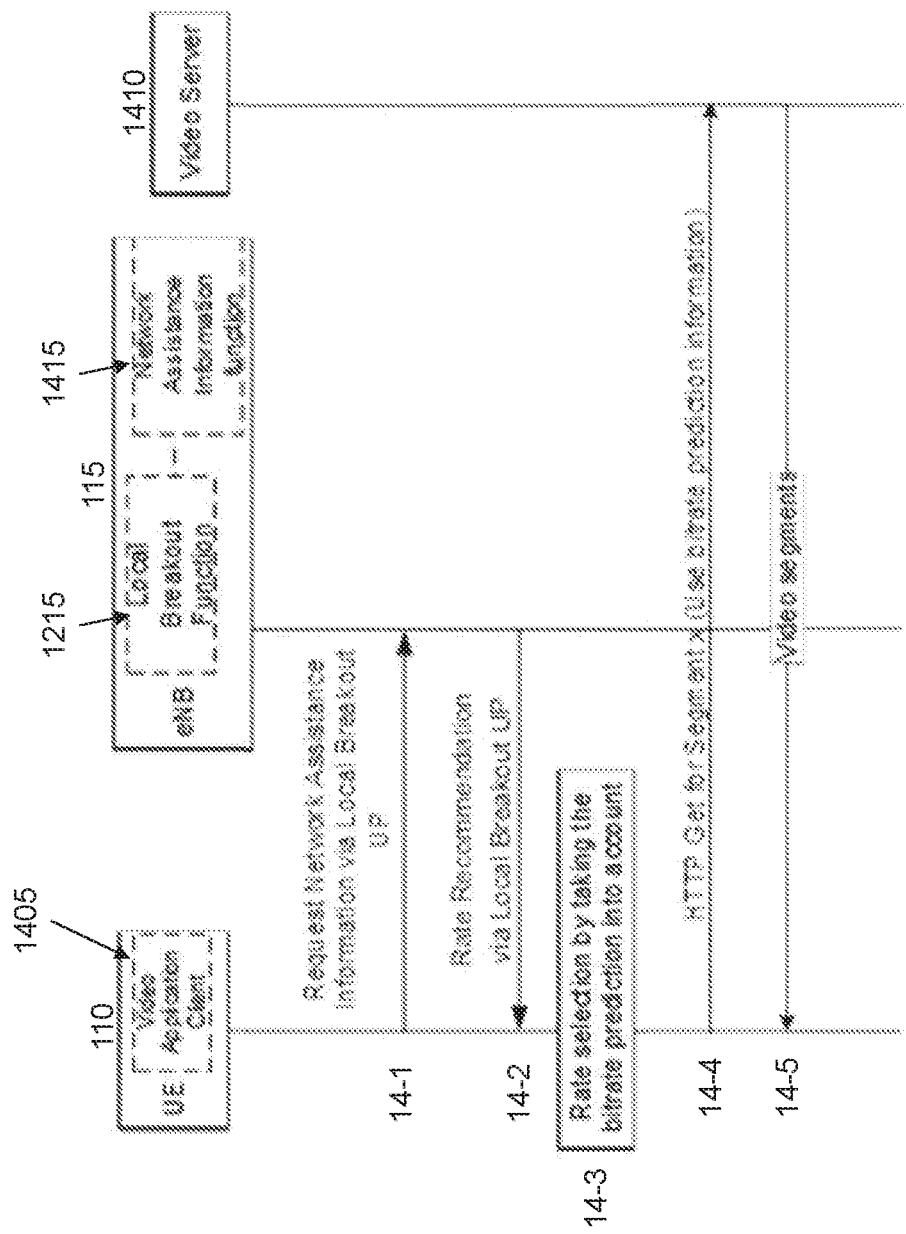
FIG. 14 illustrates an example sequence for a client interacting with a network assistance function via the local breakout function gateway, in accordance with certain embodiments.

FIG. 14 illustrates an example sequence for a client interacting with a network assistance function via the local breakout function gateway, in accordance with certain embodiments. More particularly, FIG. 14 illustrates an exchange of signaling between a wireless device 110 (e.g., a UE in the example of FIG. 14), including a video application client 1405, a network node 115 (e.g., an eNB in the example of FIG. 14), and video server 1410. In the example of FIG. 14, network node 115 includes local breakout function gateway 1215 and a network assistance information function 1415. In the description of FIG. 14 that follows, the Interaction Gateway is denoted as network assistance function 1415.

At step 14-1, video client 1405 in wireless device 110 requests (e.g., via an HTTP signaling message sent over UP bearers) network assistance information via a UP bearer that is terminated at network node 115 (i.e., at the RAN). In other words, the bearer breaks out at the RAN. Network node 115 holds information regarding RRM and is able to estimate an optimal traffic rate for the service used by video client 1405 at wireless device 110. Such optimal traffic rate could be based on any suitable criteria. For example, the optimal traffic rate could be based on one or more of estimated resources available and an available throughput for a given service. It is important that such recommended rate is calculated by the RAN node 115 because only the RAN is aware of, for example, other wireless devices competing for the same resources, overall load of the radio interface, future commitments in terms of resource allocation, such as semi persistent scheduling.

At step 14-2, network node 115 responds to the request via signaling (e.g., HTTP signaling) sent over the breakout bearer at UP, where the recommended (e.g., optimal) traffic rate is sent to video client 1405.

At step 14-3, wireless device 110 performs rate selection by taking into account the recommended traffic rate provided by network node 115. This assistance information can be used by video client 1405 of wireless device 110 when requesting media content from video server 1410 at step 14-4. For example, video client 1405 could ask video server 1410 to send video segments at the rate recommended by the network node 115 via the Network Assistance Information function 1415. At step 14-5, video server 1410 sends video segments to wireless device 110.

By following this method, the network assistance information (e.g., recommended rate) is advantageously exchanged by entities at the termination points of a UP bearer (i.e., the local breakout bearer). Notably, this is in line with the 3GPP standardization principle that UP traffic cannot be injected or removed in places that are not the termination points of a UP bearer.

Figure 15:
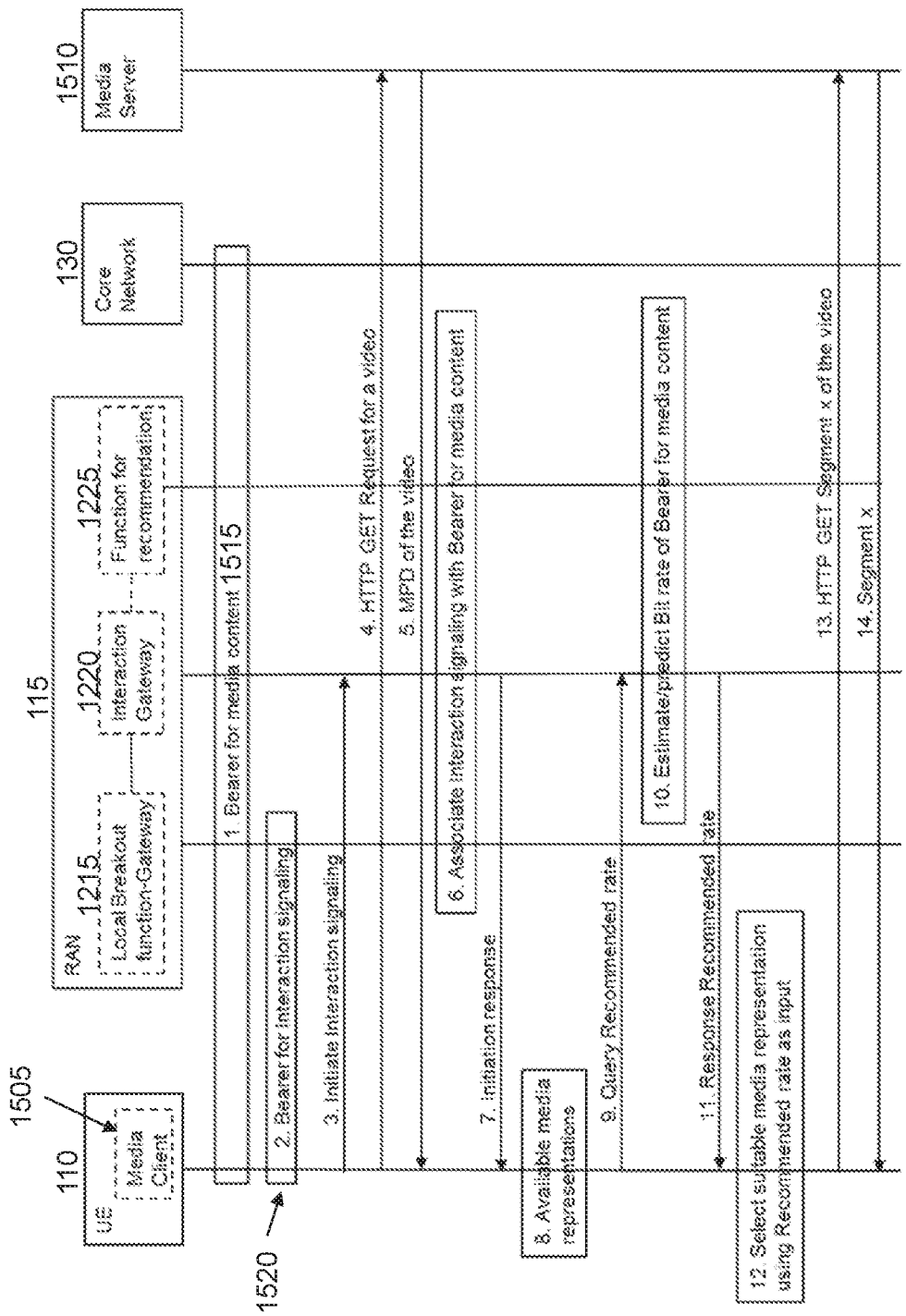
FIG. 15 is an example sequence diagram for the use case network assistance for adaptive bit rate video streaming, in accordance with certain embodiments.

FIG. 15 is an example sequence diagram for the use case network assistance for adaptive bit rate video streaming, in accordance with certain embodiments. More particularly, FIG. 15 illustrates an exchange of signaling between a wireless device 110 (e.g., a UE in the example of FIG. 15), including a media client 1505, a network node 115 (e.g., an eNB), core network node 130 and media server 1510. In the example of FIG. 15, network node 115 includes local breakout function gateway 1215, Interaction Gateway 1220, and function for recommendation 1225.

At step 15-1, a bearer 1515 is established between wireless device 110 (e.g., a UE comprising media client 1505 in the example of FIG. 15) and core network node 130 for user data (i.e., the media delivery from media server 1510). At step 15-2, a bearer to local breakout function gateway 1215 in network node 115 is established to carry the Interaction signaling to Interaction Gateway 1220. The bearer may be established in any suitable manner. As one non-limiting example, the bearer may be established by using a separate APN configured for Interaction Gateway 1220. As another non-limiting example, the bearer may be established by using separate filters (e.g., TFTs) for Interaction Gateway 1220.

At step 15-3, Interaction signaling is initiated from media client 1505 of wireless device 110 to network node 115 (an in particular Interaction gateway 1220 included in network node 115 via local breakout function gateway 1215). Media client 1505 of wireless device 110 may include information about how to identify the media delivery such that bearer 1515 carrying the media delivery may be associated with the query. The identification information may be any suitable identification information. For example, in certain embodiments the identification information may be a 5-tuple, part of a 5-tuple (such as a port number), a 4-tuple (e.g., client IP, client port, server IP and protocol ID), a client IP and/or server SNI, marked packets, and/or some other kind of marking/identity of the media packets.

At step 15-4, media client 1505 of wireless device 110 sends a first request for a video towards media server 1510. At step 15-5, the MPD is downloaded to media client 1505 of wireless device 110 from media server 1510.

At step 15-6, network node 115 associates the Interaction signaling with bearer 1515 carrying the media content, such that a recommended rate may be derived based on information related to bearer 1515 carrying the media content. In certain embodiments, network node 115 performs inspection of the traffic in all bearers related to wireless device 110 using the identification information included in the Initiation message. When media content is identified in a bearer, that bearer is marked as the media content bearer associated with the Interaction signaling.

At step 15-7, Interaction Gateway 1220 at network node 115 sends an Initiation response to media client 1505 of wireless device 110. At step 15-8, media client 1505 of wireless device 110 reads what media representations are available from the MPD.

At step 15-9, media client 1505 of wireless device 110 sends a query to Interaction Gateway 1220 at network node 115 over bearer 1520 to get a recommended rate. In certain embodiments, the query may include available media representations.

At step 15-10, network node 115 (via Interaction gateway 1220 and function for recommendation 1225) estimates/predicts the bit rate for bearer 1515 carrying the media delivery. The estimation may be based on any suitable criteria. For example, in certain embodiments the estimation may be based on information such as one or more of: a number of wireless devices in the cell that shares the capacity; the wireless device's radio conditions; and a QoS (e.g., priority) of the bearer. Network node 115 derives a recommended rate.

At step 15-11, network node 115 sends the derived recommended rate to Media client 1505 of wireless device 110 over bearer 1520. At step 15-12, media client 1505 of wireless device 110 selects a suitable Media Representation using the recommended rate as input. At step 15-13, media client 1505 of wireless device 110 sends a request to media server 1510 to download a media segment x with the selected media representation. At step 15-14, the media client of wireless device 110 downloads segment x from media server 1520.

Figure 16:
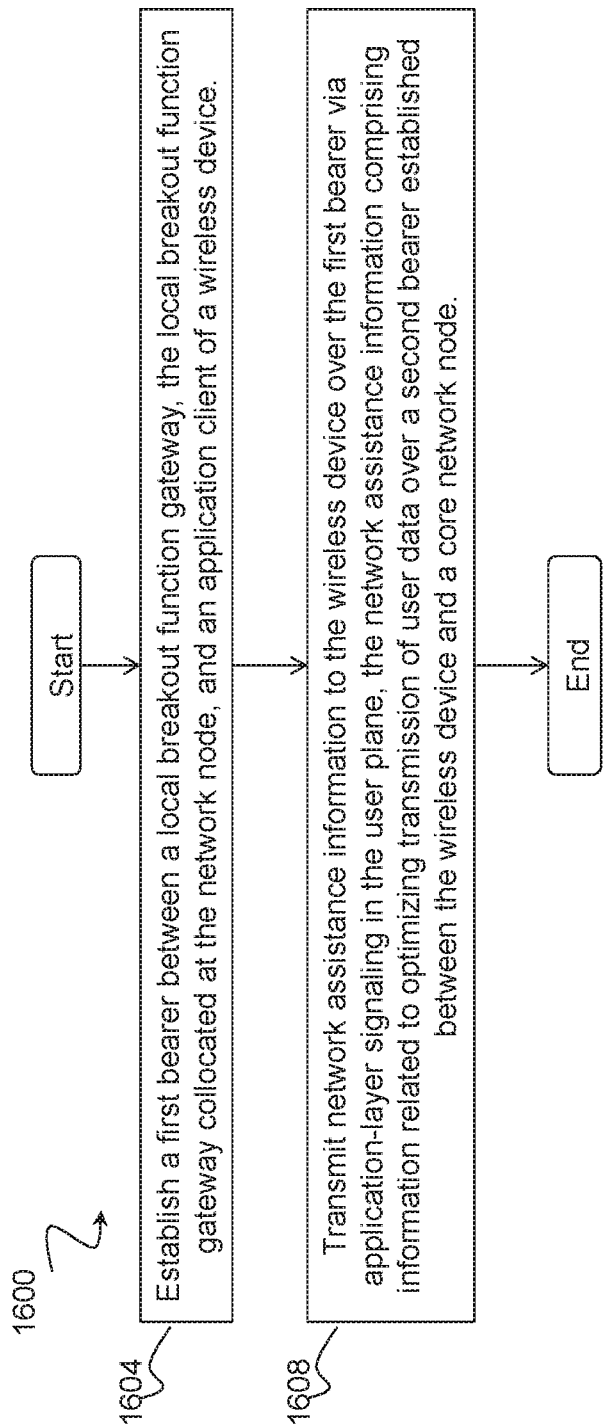
FIG. 16 is a flow diagram of a method in a network node, in accordance with certain embodiments.

FIG. 16 is a flow diagram of a method 1600 in a network node, in accordance with certain embodiments. Method 1600 begins at step 1604, where the network node establishes a first bearer between a local breakout function gateway, the local breakout function gateway collocated at the network node, and an application client of a wireless device. In certain embodiments, the wireless device may be a user equipment In certain embodiments, establishing the first bearer between the local breakout function gateway collocated at the network node and the application client of the wireless device may comprise defining one or more filters for routing the application-layer signaling and providing the one or more filters to the wireless device. In certain embodiments, establishing the first bearer between the local breakout function gateway collocated at the network node and the application client of the wireless device may comprise configuring an access point name at the wireless device for the first bearer and performing selected Internet Protocol traffic offload using the configured access point name for the first bearer.

At step 1608, the network node transmits network assistance information to the wireless device over the first bearer via application-layer signaling in the user plane, the network assistance information comprising information related to optimizing transmission of user data over a second bearer established between the wireless device and a core network node.

In certain embodiments, the method may comprise associating the application-layer signaling transmitted over the first bearer with the user data transmitted over the second bearer. In certain embodiments, associating the application-layer signaling transmitted over the first bearer with the user data transmitted over the second bearer may comprise: receiving, from the application client of the wireless device, identification information enabling the network node to identify traffic related to the user data transmitted over the second bearer; inspecting data traffic on one or more bearers related to the wireless device; identifying, within the inspected data traffic based on the received identification information, traffic related to the user data transmitted over the second bearer; and associating the identified traffic related to the user data transmitted over the second bearer with the application-layer signaling transmitted over the first bearer. In certain embodiments, the identification information may comprise one or more Internet Protocol 5-tuples.

In certain embodiments, the method may comprise determining the network assistance data based on one or more criteria. The one or more criteria may comprise one or more of: a number of wireless devices in a cell associated with the network node; one or more radio conditions of the wireless device; and a quality of service associated with the second bearer. In certain embodiments, the method may comprise receiving a request for network assistance data from the wireless device over the first bearer, and determining the network assistance data based on one or more criteria in response to receiving the request. In certain embodiments, the user data transmitted over the second bearer may comprise streaming media content, the received request for network assistance data may comprise a request for a recommended rate, determining the network assistance data may comprise estimating a bit rate for the second bearer carrying the streaming media content, and transmitting the network assistance information to the wireless device may comprise transmitting the estimated bit rate for the second bearer to the wireless device over the first bearer via application-layer signaling in the user plane.

Figure 17:
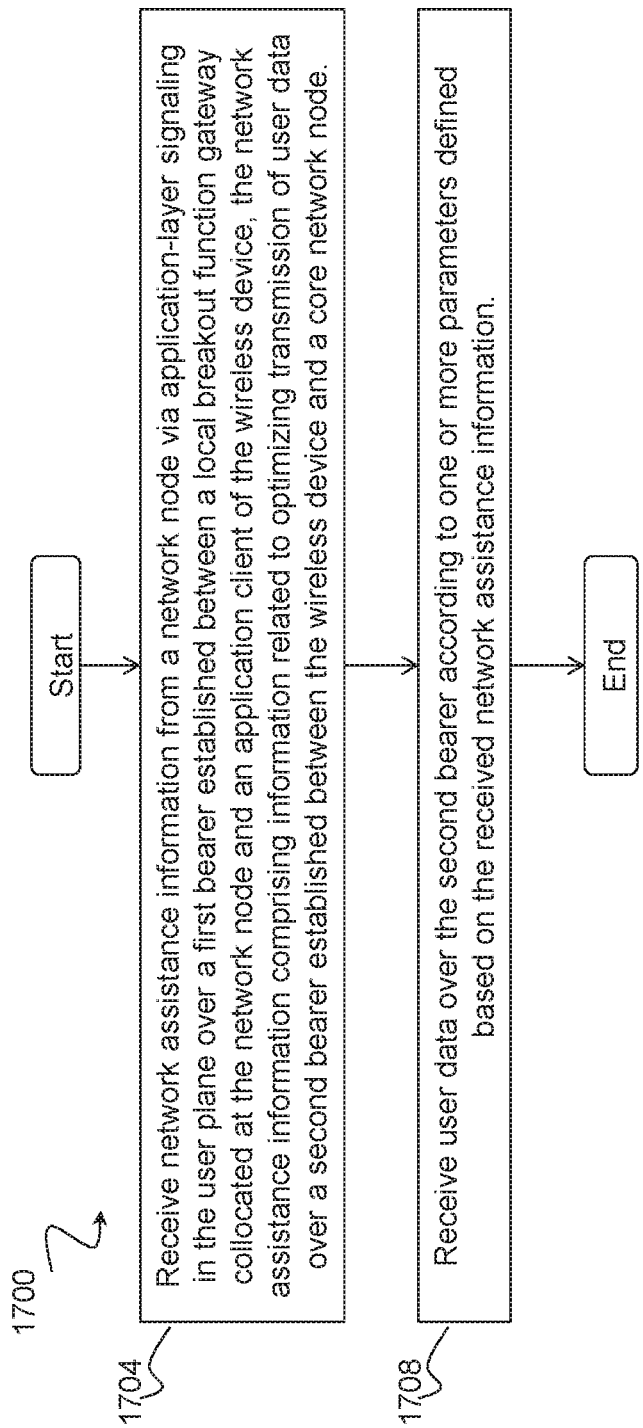
FIG. 17 is a flow diagram of a method in a wireless device, in accordance with certain embodiments.

FIG. 17 is a flow diagram of a method 1700 in a wireless device, in accordance with certain embodiments. Method 1700 begins at step 1704, where the wireless device receives network assistance information from a network node via application-layer signaling in the user plane over a first bearer established between a local breakout function gateway, the local breakout function gateway collocated at the network node, and an application client of the wireless device, the network assistance information comprising information related to optimizing transmission of user data over a second bearer established between the wireless device and a core network node. In certain embodiments, the wireless device may be a user equipment. In certain embodiments, the application-layer signaling in the user plane over the first bearer may comprise HTTP or HTTPS signaling.

In certain embodiments, the method may comprise transmitting a request for network assistance data to the network node over the first bearer. In certain embodiments, the user data received over the second bearer may comprise streaming media content, the transmitted request for network assistance data may comprise a request for a recommended rate from the network node, the received network assistance data may comprise an estimated bit rate for the second bearer carrying the streaming media content, the one or more parameters may be defined based on the estimated bit rate, and the method may comprise requesting the streaming media content based on the estimated bit rate.

In certain embodiments, the method may comprise receiving one or more filters defined for routing the application-layer signaling, the one or more filters received in connection with establishing the first bearer between the local breakout function gateway collocated at the network node and the application client of the wireless device.

In certain embodiments, the method may comprise receiving a configuration for an access point name for the first bearer, the configuration for the access point name received in connection with establishing the first bearer between the local breakout function gateway collocated at the network node and the application client of the wireless device.

At step 1708, the wireless device receives user data over the second bearer according to one or more parameters defined based on the received network assistance information.

In certain embodiments, the method may comprise providing identification information to the network node, the identification information for associating the application-layer signaling over the first bearer with the user data received over the second bearer. The identification information may comprise one or more Internet Protocol 5-tuples.

Figure 18:
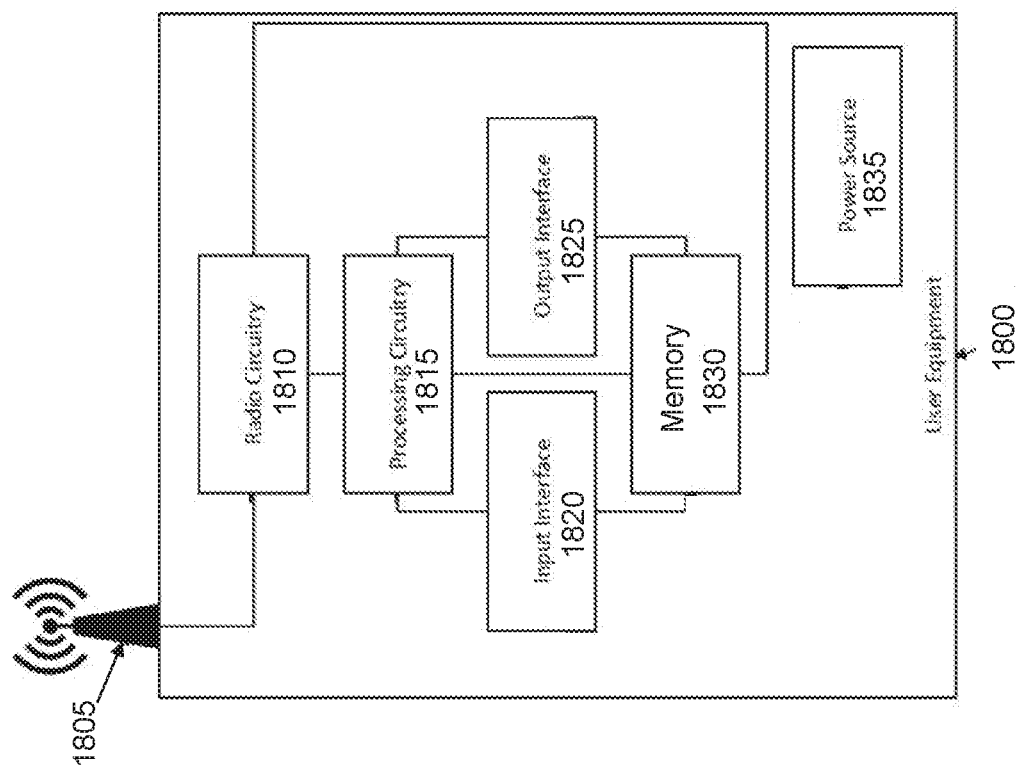
FIG. 18 is a block schematic of an exemplary UE, in accordance with certain embodiments.

FIG. 18 is a block schematic of an exemplary UE, in accordance with certain embodiments. As shown in FIG. 18, UE 1800 is an example wireless device 110 described above. UE 1800 includes an antenna 1805, radio front-end circuitry 1810, processing circuitry 1815, and a computer-readable storage medium 1830. Antenna 1805 may include one or more antennas or antenna arrays, and is configured to send and/or receive wireless signals, and is connected to radio front-end circuitry 1810. In certain alternative embodiments, wireless device 1800 may not include antenna 1805, and antenna 1805 may instead be separate from wireless device 1800 and be connectable to wireless device 1800 through an interface or port.

The radio front-end circuitry 1810 may comprise various filters and amplifiers, is connected to antenna 1805 and processing circuitry 1815, and is configured to condition signals communicated between antenna 1805 and processing circuitry 1815. In certain alternative embodiments, UE 1800 may not include radio front-end circuitry 1810, and processing circuitry 1815 may instead be connected to antenna 1805 without radio front-end circuitry 1810.

Processing circuitry 1815 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 1815 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 1815 executing instructions stored on a computer-readable storage medium 1830. In alternative embodiments, some or all of the functionality may be provided by the processing circuitry 1815 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 1815 alone or to other components of UE 1800, but are enjoyed by the UE as a whole, and/or by end users and the wireless network generally.

Antenna 1805, radio front-end circuitry 1810, and/or processing circuitry 1815 may be configured to perform any receiving operations described herein as being performed by a UE or wireless device. Any information, data and/or signals may be received from a network node and/or another wireless device.

The processing circuitry 1815 may be configured to perform any determining operations described herein as being performed by a wireless device. Determining as performed by processing circuitry 1815 may include processing information obtained by the processing circuitry 1815 by, for example, converting the obtained information into other information, comparing the obtained information or converted information to information stored in the wireless device, and/or performing one or more operations based on the obtained information or converted information, and as a result of said processing making a determination.

Antenna 1805, radio front-end circuitry 1810, and/or processing circuitry 1815 may be configured to perform any transmitting operations described herein as being performed by a wireless device. Any information, data and/or signals may be transmitted to a network node and/or another wireless device.

Computer-readable storage medium 1830 is generally operable to store instructions, such as a computer program, software, an application including one or more of logic, rules, code, tables, etc. and/or other instructions capable of being executed by a processor. Examples of computer-readable storage medium 1830 include computer memory (for example, RAM or ROM), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 1815. In some embodiments, processing circuitry 1815 and computer-readable storage medium 1830 may be considered to be integrated.

Alternative embodiments of UE 1800 may include additional components beyond those shown in FIG. 18 that may be responsible for providing certain aspects of the UE's functionality, including any of the functionality described herein and/or any functionality necessary to support the solution described above. As just one example, UE 1800 may include input interfaces, devices and circuits 1820, and output interfaces, devices and circuits 1825. Input interfaces, devices, and circuits 1820 are configured to allow input of information into UE 1800, and are connected to processing circuitry 1815 to allow processing circuitry 1815 to process the input information. For example, input interfaces, devices, and circuits 1820 may include a microphone, a proximity or other sensor, keys/buttons, a touch display, one or more cameras, a USB port, or other input elements. Output interfaces, devices, and circuits 1825 are configured to allow output of information from UE 1800, and are connected to processing circuitry 1815 to allow processing circuitry 1815 to output information from UE 1800. For example, output interfaces, devices, or circuits 1825 may include a speaker, a display, vibrating circuitry, a USB port, a headphone interface, or other output elements. Using one or more input and output interfaces 1820, 1825, devices, and circuits, UE 1800 may communicate with end users and/or the wireless network, and allow them to benefit from the functionality described herein.

As another example, UE 1800 may include power source 1835. Power source 1835 may comprise power management circuitry. Power source 1835 may receive power from a power supply, which may either be comprised in, or be external to, power source 1835. For example, UE 1800 may comprise a power supply in the form of a battery or battery pack which is connected to, or integrated in, power source 1835. Other types of power sources, such as photovoltaic devices, may also be used. As a further example, UE 1800 may be connectable to an external power supply (such as an electricity outlet) via an input circuitry or interface such as an electrical cable, whereby the external power supply supplies power to power source 1835. Power source 1835 may be connected to radio front-end circuitry 1810, processing circuitry 1815, and/or computer-readable storage medium 1830 and be configured to supply UE 1800, including processing circuitry 1815, with power for performing the functionality described herein.

UE 1800 may also include multiple sets of processing circuitry 1815, computer-readable storage medium 1830, radio circuitry 1810, and/or antenna 1805 for different wireless technologies integrated into wireless device 1800, such as, for example, GSM, WCDMA, LTE, NR, WiFi, or Bluetooth wireless technologies. These wireless technologies may be integrated into the same or different chipsets and other components within wireless device 1800.

Figure 19:
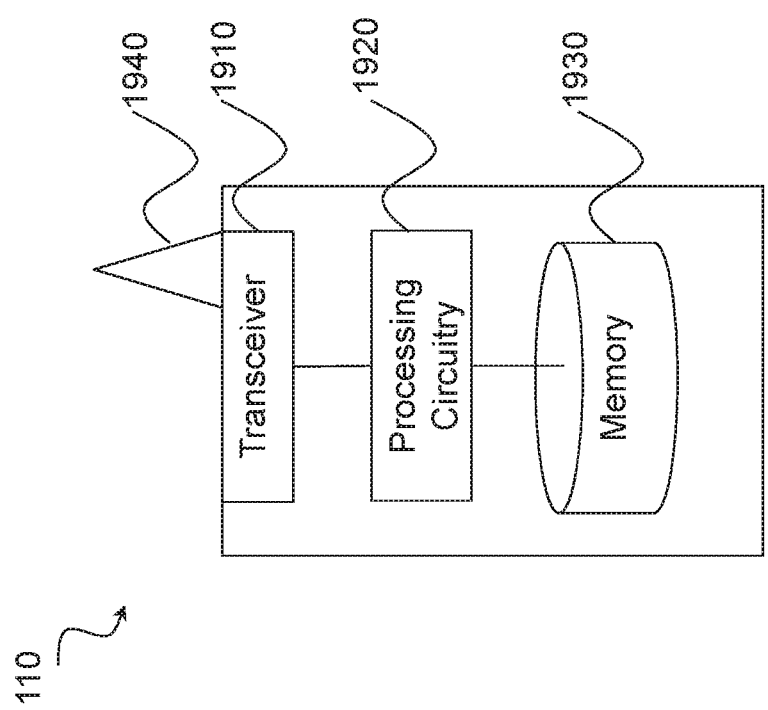
FIG. 19 is a block schematic of an exemplary wireless device, in accordance with certain embodiments.

FIG. 19 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, an actuator, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 1910, processing circuitry 1920, and memory 1930. In some embodiments, transceiver 1910 facilitates transmitting wireless signals to and receiving wireless signals from network node 115 (e.g., via antenna 1940), processing circuitry 1920 executes instructions to provide some or all of the functionality described above as being provided by wireless device 110, and memory 1930 stores the instructions executed by processing circuitry 1920.

Processing circuitry 1920 may include any suitable combination of hardware and software implemented in one or more modules to execute instructions and manipulate data to perform some or all of the described functions of wireless device 110, such as the functions of wireless device 110 described above in relation to FIGS. 1-17. In some embodiments, processing circuitry 1920 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1930 is generally operable to store instructions, such as a computer program, software, an application including one or more of logic, rules, algorithms, code, tables, etc. and/or other instructions capable of being executed by processing circuitry 1920. Examples of memory 1930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 1920.

Other embodiments of wireless device 110 may include additional components beyond those shown in FIG. 19 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 1920. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 20:
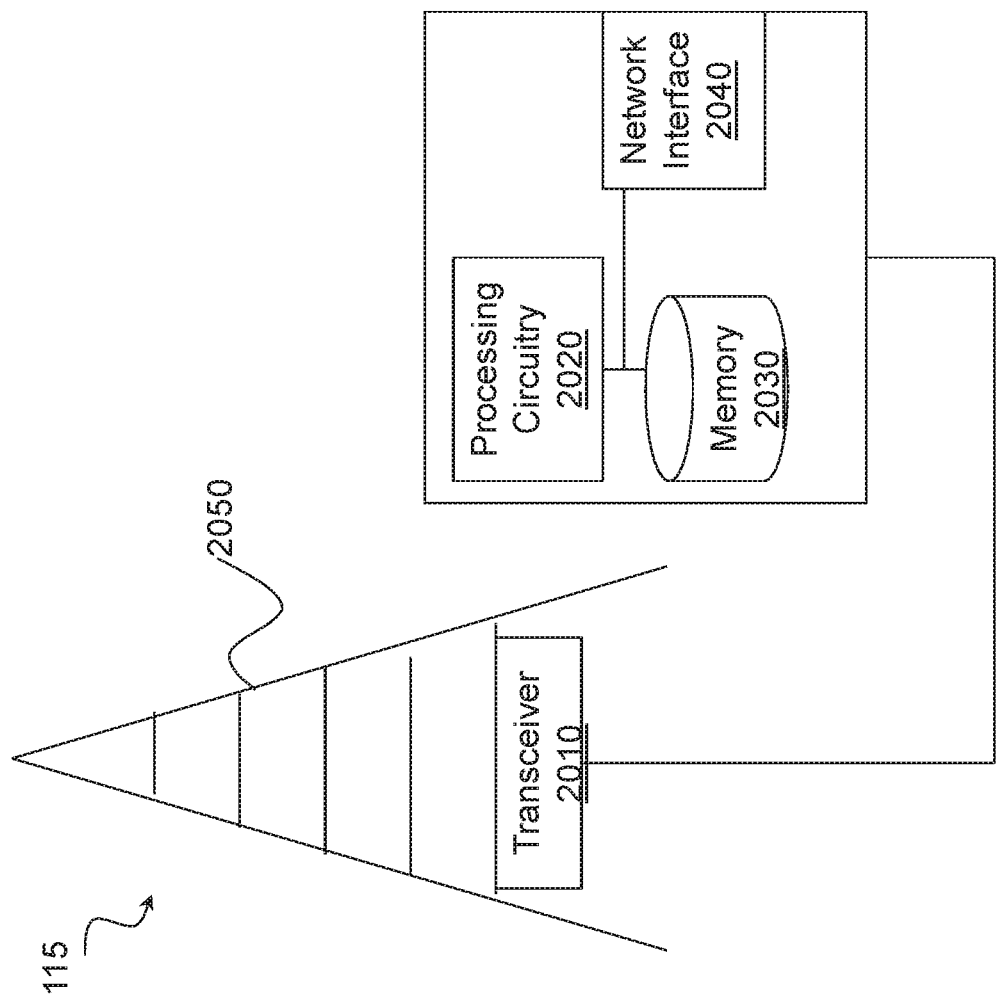
FIG. 20 is a block schematic of an exemplary network node, in accordance with certain embodiments.

FIG. 20 is a block schematic of an exemplary network node 115, in accordance with certain embodiments. Network node 115 may be any type of radio network node or any network node that communicates with a UE and/or with another network node. Examples of network node 115 include an eNodeB, a gNB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 2010, processing circuitry 2020, memory 2030, and network interface 2040. In some embodiments, transceiver 2010 facilitates transmitting wireless signals to and receiving wireless signals from wireless device 110 (e.g., via antenna 2050), processing circuitry 2020 executes instructions to provide some or all of the functionality described above as being provided by a network node 115, memory 2030 stores the instructions executed by processing circuitry 2020, and network interface 2040 communicates signals to backend network components, such as a gateway, switch, router, Internet, Public Switched Telephone Network (PSTN), core network nodes or radio network controllers 130, etc.

Processing circuitry 2020 may include any suitable combination of hardware and software implemented in one or more modules to execute instructions and manipulate data to perform some or all of the described functions of network node 115, such as those described above in relation to FIGS. 1-17. In some embodiments, processing circuitry 2020 may include, for example, one or more computers, one or more CPUs, one or more microprocessors, one or more applications, one or more ASICs, one or more FPGAs and/or other logic.

Memory 2030 is generally operable to store instructions, such as a computer program, software, an application including one or more of logic, rules, algorithms, code, tables, etc. and/or other instructions capable of being executed by processing circuitry 2020. Examples of memory 2030 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 2040 is communicatively coupled to processing circuitry 2020 and may refer to any suitable device operable to receive input for network node 115, send output from network node 115, perform suitable processing of the input or output or both, communicate to other devices, or any combination of the preceding. Network interface 2040 may include appropriate hardware (e.g., port, modem, network interface card, etc.) and software, including protocol conversion and data processing capabilities, to communicate through a network.

Other embodiments of network node 115 may include additional components beyond those shown in FIG. 20 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 21:
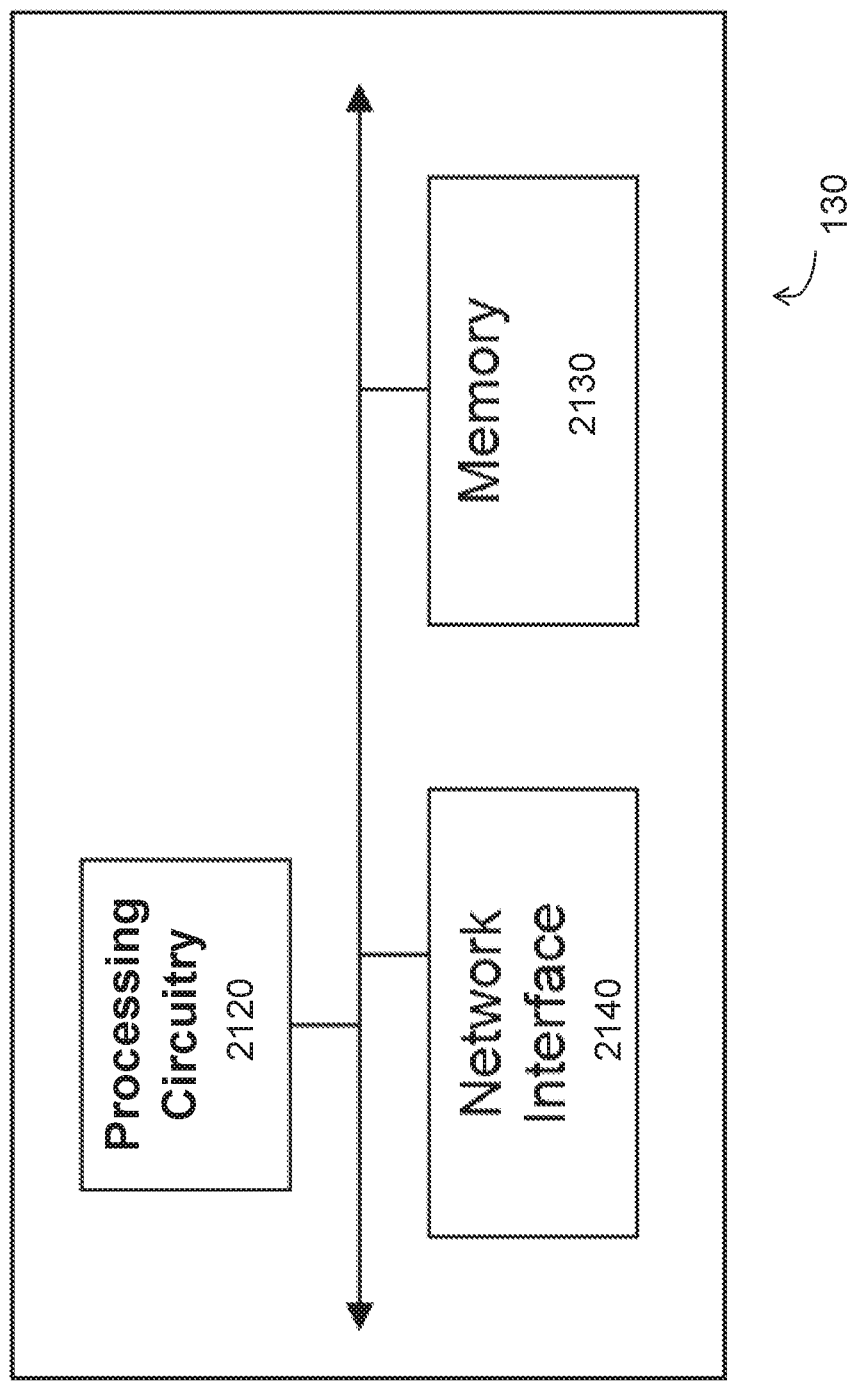
FIG. 21 is a block schematic of an exemplary radio network controller or core network node, in accordance with certain embodiments.

FIG. 21 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 2120, memory 2130, and network interface 2140. In some embodiments, processing circuitry 2120 executes instructions to provide some or all of the functionality described above as being provided by the network node, memory 2130 stores the instructions executed by processing circuitry 2120, and network interface 2140 communicates signals to any suitable node, such as a gateway, switch, router, Internet, Public Switched Telephone Network (PSTN), network nodes 115, radio network controllers or core network nodes 130, etc.

Processing circuitry 2120 may include any suitable combination of hardware and software implemented in one or more modules to execute instructions and manipulate data to perform some or all of the described functions of the radio network controller or core network node 130. In some embodiments, processing circuitry 2120 may include, for example, one or more computers, one or more CPUs, one or more microprocessors, one or more applications, one or more ASICs, one or more FPGAs and/or other logic.

Memory 2130 is generally operable to store instructions, such as a computer program, software, an application including one or more of logic, rules, algorithms, code, tables, etc. and/or other instructions capable of being executed by processing circuitry 2120. Examples of memory 2130 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 2140 is communicatively coupled to processing circuitry 2120 and may refer to any suitable device operable to receive input for the network node, send output from the network node, perform suitable processing of the input or output or both, communicate to other devices, or any combination of the preceding. Network interface 2140 may include appropriate hardware (e.g., port, modem, network interface card, etc.) and software, including protocol conversion and data processing capabilities, to communicate through a network.

Other embodiments of the network node may include additional components beyond those shown in FIG. 21 that may be responsible for providing certain aspects of the network node's functionality, including any of the functionality described above and/or any additional functionality (including any functionality necessary to support the solution described above).

Figure 22:
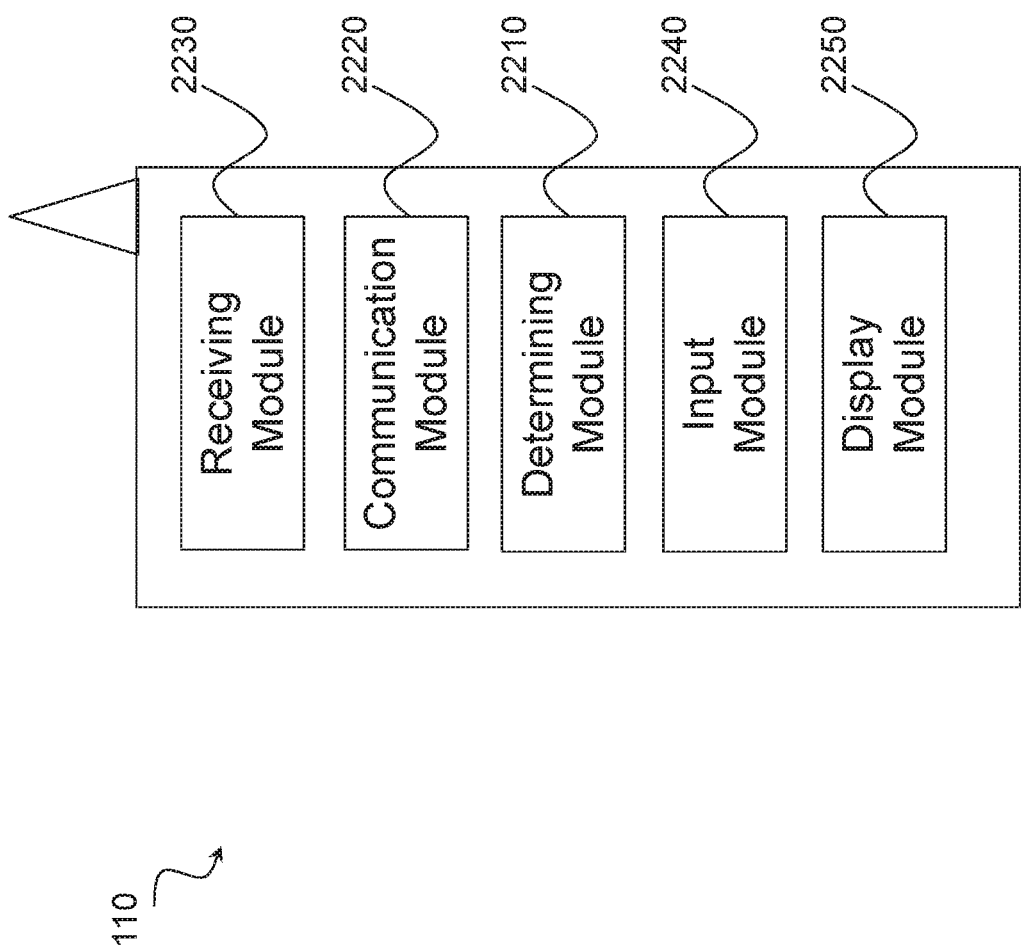
FIG. 22 is a block schematic of an exemplary wireless device, in accordance with certain embodiments.

FIG. 22 is a schematic block diagram of an exemplary wireless device, in accordance with certain embodiments. Wireless device 110 may include one or more modules. For example, wireless device 110 may include a determining module 2210, a communication module 2220, a receiving module 2230, an input module 2240, a display module 2250, and any other suitable modules. In some embodiments, one or more of determining module 2210, communication module 2220, receiving module 2230, input module 2240, display module 2250, or any other suitable module may be implemented using one or more processors, such as processing circuitry 1920 described above in relation to FIG. 19. In certain embodiments, the functions of two or more of the various modules may be combined into a single module. Wireless device 110 may perform the methods for network assistance via a local breakout function gateway in RAN described above in relation to FIGS. 1-17.

Determining module 2210 may perform the processing functions of wireless device 110. Determining module 2210 may include or be included in one or more processors, such as processing circuitry 1920 described above in relation to FIG. 19. Determining module 2210 may include analog and/or digital circuitry configured to perform any of the functions of determining module 2210 and/or processing circuitry 1920 described above. The functions of determining module 2210 described above may, in certain embodiments, be performed in one or more distinct modules.

Communication module 2220 may perform the transmission functions of wireless device 110. For example, communication module 2220 may provide identification information to the network node, the identification information for associating the application-layer signaling over the first bearer with the user data received over the second bearer. As another example, communication module 2220 may transmit a request for network assistance data to the network node over the first bearer. As still another example, communication module 2220 may request the streaming media content based on the estimated bit rate.

Communication module 2220 may include a transmitter and/or a transceiver, such as transceiver 1910 described above in relation to FIG. 19. Communication module 2220 may include circuitry configured to wirelessly transmit messages and/or signals. In particular embodiments, communication module 2220 may receive messages and/or signals for transmission from determining module 2210. In certain embodiments, the functions of communication module 2220 described above may be performed in one or more distinct modules.

Receiving module 2230 may perform the receiving functions of wireless device 110. For example, receiving module 2230 may receive network assistance information from a network node via application-layer signaling in the user plane over a first bearer established between a local breakout function gateway, the local breakout function gateway collocated at the network node, and an application client of the wireless device, the network assistance information comprising information related to optimizing transmission of user data over a second bearer established between the wireless device and a core network node. As another example, receiving module 2230 may receive user data over the second bearer according to one or more parameters defined based on the received network assistance information. As still another example, receiving module 2230 may receive one or more filters defined for routing the application-layer signaling, the one or more filters received in connection with establishing the first bearer between the local breakout function gateway collocated at the network node and the application client of the wireless device. As yet another example, receiving module 2230 may receive a configuration for an access point name for the first bearer, the configuration for the access point name received in connection with establishing the first bearer between the local breakout function gateway collocated at the network node and the application client of the wireless device.

Receiving module 2230 may include a receiver and/or a transceiver. Receiving module 2230 may include a receiver and/or a transceiver, such as transceiver 1910 described above in relation to FIG. 19. Receiving module 2230 may include circuitry configured to wirelessly receive messages and/or signals. In particular embodiments, receiving module 2230 may communicate received messages and/or signals to determining module 2210. The functions of receiving module 2230 described above may, in certain embodiments, be performed in one or more distinct modules.

Input module 2240 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 2210. The functions of input module 2240 described above may, in certain embodiments, be performed in one or more distinct modules.

Display module 2250 may present signals on a display of wireless device 110. Display module 2250 may include the display and/or any appropriate circuitry and hardware configured to present signals on the display. Display module 2250 may receive signals to present on the display from determining module 2210. The functions of display module 2250 described above may, in certain embodiments, be performed in one or more distinct modules.

Determining module 2210, communication module 2220, receiving module 2230, input module 2240, and display module 2250 may include any suitable configuration of hardware and/or software. Wireless device 110 may include additional modules beyond those shown in FIG. 22 that may be responsible for providing any suitable functionality, including any of the functionality described above and/or any additional functionality (including any functionality necessary to support the various solutions described herein).

FIG. 23 is a schematic block diagram of an exemplary network node 115, in accordance with certain embodiments. Network node 115 may include one or more modules. For example, network node 115 may include determining module 2310, communication module 2320, receiving module 2330, and any other suitable modules. In some embodiments, one or more of determining module 2310, communication module 2320, receiving module 2330, or any other suitable module may be implemented using one or more processors, such as processing circuitry 2020 described above in relation to FIG. 20. In certain embodiments, the functions of two or more of the various modules may be combined into a single module. Network node 115 may perform the methods for network assistance via a local breakout function gateway in RAN described above with respect to FIGS. 1-17.

Determining module 2310 may perform the processing functions of network node 115. As an example, determining module 2310 may establish a first bearer between a local breakout function gateway, the local breakout function gateway collocated at the network node, and an application client of a wireless device. In certain embodiments, determining module 2310 may establish the first bearer between the local breakout function gateway collocated at the network node and the application client of the wireless device by defining one or more filters for routing the application-layer signaling and providing the one or more filters to the wireless device. In certain embodiments, determining module 2310 may establish the first bearer between the local breakout function gateway collocated at the network node and the application client of the wireless device by configuring an access point name at the wireless device for the first bearer and performing selected Internet Protocol traffic offload using the configured access point name for the first bearer.

As another example, determining module 2310 may associate the application-layer signaling transmitted over the first bearer with the user data transmitted over the second bearer. As still another example, determining module 2310 may: inspect data traffic on one or more bearers related to the wireless device; identify, within the inspected data traffic based on the received identification information, traffic related to the user data transmitted over the second bearer; and associate the identified traffic related to the user data transmitted over the second bearer with the application-layer signaling transmitted over the first bearer. As yet another example, determining module 2310 may determine the network assistance data based on one or more criteria. As another example, determining module 2310 may determine the network assistance data based on one or more criteria in response to receiving a request. As another example, determining module 2310 may determine the network assistance data by estimating a bit rate for the second bearer carrying the streaming media content.

Determining module 2310 may include or be included in one or more processors, such as processing circuitry 2020 described above in relation to FIG. 20. Determining module 2310 may include analog and/or digital circuitry configured to perform any of the functions of determining module 2310 and/or processing circuitry 2020 described above. The functions of determining module 2310 may, in certain embodiments, be performed in one or more distinct modules. As one example, in certain embodiments the functions of determining module 2310 may be performed by one or more of a local breakout function gateway module, an interaction gateway module, and a function for recommendation module.

Communication module 2320 may perform the transmission functions of network node 115. As one example, communication module 2320 may transmit network assistance information to the wireless device over the first bearer via application-layer signaling in the user plane, the network assistance information comprising information related to optimizing transmission of user data over a second bearer established between the wireless device and a core network node. As another example, communication module 2320 may transmit the network assistance information to the wireless device by transmitting an estimated bit rate for the second bearer to the wireless device over the first bearer via application-layer signaling in the user plane Communication module 2320 may transmit messages to one or more of wireless devices 110. Communication module 2320 may include a transmitter and/or a transceiver, such as transceiver 2010 described above in relation to FIG. 20. Communication module 2320 may include circuitry configured to wirelessly transmit messages and/or signals. In particular embodiments, communication module 2320 may receive messages and/or signals for transmission from determining module 2310 or any other module. The functions of communication module 2320 may, in certain embodiments, be performed in one or more distinct modules.

Receiving module 2330 may perform the receiving functions of network node 115. As one example, receiving module 2330 may receive, from the application client of the wireless device, identification information enabling the network node to identify traffic related to the user data transmitted over the second bearer. As another example, receiving module 2330 may receive a request for network assistance data from the wireless device over the first bearer.

Receiving module 2330 may receive any suitable information from a wireless device. Receiving module 2330 may include a receiver and/or a transceiver, such as transceiver 2010 described above in relation to FIG. 20. Receiving module 2330 may include circuitry configured to wirelessly receive messages and/or signals. In particular embodiments, receiving module 2330 may communicate received messages and/or signals to determining module 2310 or any other suitable module. The functions of receiving module 2330 may, in certain embodiments, be performed in one or more distinct modules.

Determining module 2310, communication module 2320, and receiving module 2330 may include any suitable configuration of hardware and/or software. Network node 115 may include additional modules beyond those shown in FIG. 23 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP 3$^{rd}$ Generation Partnership Project
AF Application Function
AMBR Aggregated Maximum Bit Rates
AP Access Point
APN Access Point Name
ARP Allocation and Retention Policy
ASIC Application Specific Integrated Circuit
BER Block Error Rate
BS Base Station
BSC Base Station Controller
BTS Base Transceiver Station
CD Compact Disk
CDN Content Delivery Network
CP Control Plane
CPE Customer Premises Equipment
CPU Central Processing Unit
CRC Cyclic Redundancy Check
D2D Device-to-device
DANE Dash-aware Network Element
DAS Distributed Antenna System
DASH Dynamic Adaptive Streaming over HTTP
DL Downlink
DoS Denial of Service
DVD Digital Video Disk
eNB evolved Node B
EPC Evolved Packet Core
EPS Evolved Packet System
E-SMLC Evolved Serving Mobile Location Center
E-UTRAN Evolved Universal Terrestrial Radio Access Network
FPGA Field Programmable Gate Array
GBR Guaranteed Bit Rate
GPRS General Packet Radio Service
GPS Global Positioning System
GTP GPRS Tunneling Protocol
HSS Home Subscriber Server
HTTP Hypertext Transfer Protocol
HTTP HTTP Secure
IoT Internet of Things
IP Internet Protocol
IMS IP Multimedia Subsystem
LAN Local Area Network
LEE Laptop Embedded Equipment
L-GW Local Gateway
LME Laptop Mounted Equipment
LTE Long Term Evolution
M2M Machine-to-Machine
MAC Medium Access Control
MAN Metropolitan Area Network
MBR Maximum Bit Rate
MCE Multi-cell/multicast Coordination Entity
MCS Modulation level and coding scheme
MDT Minimization of Drive Test
MIMO Multiple Input Multiple Output
MME Mobility Management Entity
MPD Media Presentation Description
MSC Mobile Switching Center
MSR Multi-standard Radio
MTC Machine-Type Communication
NAS Non-Access Stratum
NB-IoT Narrow band Internet of Things
NR New Radio
O&M Operations and Management
OS Operating System
OSS Operations Support System
PCC Policy Control and Charging
PCRF Policy and Charging Rules Function
PDCP Packet Data Convergence Protocol
PDN Packet Data Network
PED Parameters Enhancing Delivery
PER Parameters Enhancing Reception
PGW Packet Data Network Gateway
PHY Physical
PSTN Public Switched Telephone Network
QCI QoS Class Identifier
QoE Quality of Experience
QoS Quality of Service
RAM Random Access Memory
RAN Radio Access Network
RAT Radio Access Technology
RLC Radio Link Control RNC Radio Network Controller
RNE Regular Network Element
ROM Read-Only Memory
RRC Radio Resource Control
RRH Remote Radio Head
RRU Remote Radio Unit
RTT Round Trip Time
SAND Server and Network Assisted DASH
SGi S-GW Interface
S-GW Serving Gateway
SIPTO Selected IP Traffic Offload
SON Self-Organizing Network
TFT Traffic Flow Template
TR Technical Report
TS Technical Specification
UDP User Data Protocol
UE User Equipment
UL Uplink
UP User Plane
WAN Wide Area Network
WLAN Wireless Local Area Network

The invention claimed is:

1. A method in a network node, comprising:
establishing a first bearer between a local breakout function gateway, the local breakout function gateway collocated at the network node, and an application client of a wireless device;
transmitting network assistance information to the wireless device over the first bearer via application-layer signaling in the user plane, the network assistance information comprising information related to optimizing transmission of user data over a second bearer established between the wireless device and a core network node, wherein the second bearer is different than the first bearer; and
associating the application-layer signaling transmitted over the first bearer with the user data transmitted over the second bearer, wherein associating the application-layer signaling transmitted over the first bearer with the user data transmitted over the second bearer comprises:
receiving, from the application client of the wireless device, identification information enabling the network node to identify traffic related to the user data transmitted over the second bearer.

2. The method of claim 1, comprising associating the application-layer signaling transmitted over the first bearer with the user data transmitted over the second bearer.

3. The method of claim 2, wherein associating the application-layer signaling transmitted over the first bearer with the user data transmitted over the second bearer further comprises:
inspecting data traffic on one or more bearers related to the wireless device;
identifying, within the inspected data traffic based on the received identification information, traffic related to the user data transmitted over the second bearer; and
associating the identified traffic related to the user data transmitted over the second bearer with the application-layer signaling transmitted over the first bearer.

4. The method of claim 3, wherein the identification information comprises one or more Internet Protocol 5-tuples.

5. The method of claim 1, comprising determining the network assistance data based on one or more criteria.

6. The method of claim 5, wherein the one or more criteria comprise one or more of:
a number of wireless devices in a cell associated with the network node;
one or more radio conditions of the wireless device; and
a quality of service associated with the second bearer.

7. The method of claim 5, comprising:
receiving a request for network assistance data from the wireless device over the first bearer; and
determining the network assistance data based on one or more criteria in response to receiving the request.

8. The method of claim 7, wherein:
the user data transmitted over the second bearer comprises streaming media content;
the received request for network assistance data comprises a request for a recommended rate;
determining the network assistance data comprises estimating a bit rate for the second bearer carrying the streaming media content; and
transmitting the network assistance information to the wireless device comprises transmitting the estimated bit rate for the second bearer to the wireless device over the first bearer via application-layer signaling in the user plane.

9. A method in a wireless device, comprising:
receiving network assistance information from a network node via application-layer signaling in the user plane over a first bearer established between a local breakout function gateway, the local breakout function gateway collocated at the network node, and an application client of the wireless device, the network assistance information comprising information related to optimizing transmission of user data over a second bearer established between the wireless device and a core network node, wherein the second bearer is different than the first bearer;
providing identification information to the network node, the identification information for associating the application-layer signaling over the first bearer with the user data received over the second bearer; and
receiving user data over the second bearer according to one or more parameters defined based on the received network assistance information.

10. A network node, comprising:
a receiver;
a transmitter; and
processing circuitry coupled to the receiver and the transmitter, the processing circuitry configured to:
establish a first bearer between a local breakout function gateway, the local breakout function gateway collocated at the network node, and an application client of a wireless device;
transmit, via the transmitter, network assistance information to the wireless device over the first bearer via application-layer signaling in the user plane, the network assistance information comprising information related to optimizing transmission of user data over a second bearer established between the wireless device and a core network node, wherein the second bearer is different than the first bearer; and
associate the application-layer signaling transmitted over the first bearer with the user data transmitted over the second bearer, wherein processing circuitry configured to associate the application-layer signaling transmitted over the first bearer with the user data transmitted over the second bearer comprises processing circuitry configured to:
receive, from the application client of the wireless device, identification information enabling the network node to identify traffic related to the user data transmitted over the second bearer.

11. The network node of claim 10, wherein the processing circuitry is configured to associate the application-layer signaling transmitted over the first bearer with the user data transmitted over the second bearer.

12. The network node of claim 11, wherein the processing circuitry configured to associate the application-layer signaling transmitted over the first bearer with the user data transmitted over the second bearer further comprises processing circuitry configured to:
  inspect data traffic on one or more bearers related to the wireless device;
  identify, within the inspected data traffic based on the received identification information, traffic related to the user data transmitted over the second bearer; and
  associate the identified traffic related to the user data transmitted over the second bearer with the application-layer signaling transmitted over the first bearer.

13. The network node of claim 12, wherein the identification information comprises one or more Internet Protocol 5-tuples.

14. The network node of claim 10, wherein the processing circuitry is configured to determine the network assistance data based on one or more criteria.

15. The network node of claim 14, wherein the one or more criteria comprise one or more of:
  a number of wireless devices in a cell associated with the network node;
  one or more radio conditions of the wireless device; and
  a quality of service associated with the second bearer.

16. The network node of claim 14, wherein the processing circuitry is configured to:
  receive, via the receiver, a request for network assistance data from the wireless device over the first bearer; and
  determine the network assistance data based on one or more criteria in response to receiving the request.

17. The network node of claim 16, wherein:
  the user data transmitted over the second bearer comprises streaming media content;
  the received request for network assistance data comprises a request for a recommended rate;
  the processing circuitry configured to determine the network assistance data comprises processing circuitry configured to estimate a bit rate for the second bearer carrying the streaming media content; and
  the processing circuitry configured to transmit, via the transmitter, the network assistance information to the wireless device comprises processing circuitry configured to transmit, via the transmitter, the estimated bit rate for the second bearer to the wireless device over the first bearer via application-layer signaling in the user plane.

18. The network node of claim 10, wherein the processing circuitry configured to establish the first bearer between the local breakout function gateway collocated at the network node and the application client of the wireless device comprises processing circuitry configured to:
  define one or more filters for routing the application-layer signaling; and
  provide the one or more filters to the wireless device.

19. The network node of claim 10, where the processing circuitry configured to establish the first bearer between the local breakout function gateway collocated at the network node and the application client of the wireless device comprises processing circuitry configured to:
  configure an access point name at the wireless device for the first bearer; and
  perform selected Internet Protocol traffic offload using the configured access point name for the first bearer.

20. The network node of claim 10, wherein the wireless device is a user equipment.

21. A wireless device, comprising:
  a receiver;
  a transmitter; and
  processing circuitry coupled to the receiver and the transmitter, the processing circuitry configured to:
    receive, via the receiver, network assistance information from a network node via application-layer signaling in the user plane over a first bearer established between a local breakout function gateway, the local breakout function gateway collocated at the network node, and an application client of the wireless device, the network assistance information comprising information related to optimizing transmission of user data over a second bearer established between the wireless device and a core network node, wherein the second bearer is different than the first bearer;
    provide identification information to the network node, the identification information for associating the application-layer signaling over the first bearer with the user data received over the second bearer; and
    receive, via the receiver, user data over the second bearer according to one or more parameters defined based on the received network assistance information.

22. The wireless device of claim 21, wherein the identification information comprises one or more Internet Protocol 5-tuples.

23. The wireless device of claim 21, wherein the processing circuitry is configured to transmit, via the transmitter, a request for network assistance data to the network node over the first bearer.

24. The wireless device of claim 23, wherein:
  the user data received over the second bearer comprises streaming media content;
  the request for network assistance data comprises a request for a recommended rate from the network node;
  the network assistance data comprises an estimated bit rate for the second bearer carrying the streaming media content;
  the one or more parameters are defined based on the estimated bit rate; and
  the processing circuitry is configured to request the streaming media content based on the estimated bit rate.

25. The wireless device of claim 21, wherein the processing circuitry is configured to receive, via the receiver, one or more filters defined for routing the application-layer signaling, the one or more filters received in connection with establishing the first bearer between the local breakout function gateway collocated at the network node and the application client of the wireless device.

26. The wireless device of claim 21, wherein the processing circuitry is configured to receive, via the receiver, a configuration for an access point name for the first bearer, the configuration for the access point name received in connection with establishing the first bearer between the local breakout function gateway collocated at the network node and the application client of the wireless device.

27. The wireless device of claim 21, wherein the application-layer signaling in the user plane over the first bearer comprises Hypertext Transfer Protocol signaling.

28. The wireless device of claim 21, wherein the wireless device is a user equipment.

* * * * *